United States Patent
Nishi et al.

(10) Patent No.: US 7,686,737 B2
(45) Date of Patent: Mar. 30, 2010

(54) SPEED CONTROL STRUCTURE AND METHOD FOR WORK VEHICLE

(75) Inventors: Eiji Nishi, Kawachinagano (JP); Keishiro Nishi, Sakai (JP); Atsushi Shinkai, Tondabayashi (JP); Yasunobu Nakatani, Sakai (JP)

(73) Assignee: Kubota Corporation, Osaka (JP)

( * ) Notice: Subject to any disclaimer, the term of this patent is extended or adjusted under 35 U.S.C. 154(b) by 597 days.

(21) Appl. No.: 11/517,185

(22) Filed: Sep. 7, 2006

(65) Prior Publication Data

US 2007/0078041 A1 Apr. 5, 2007

(30) Foreign Application Priority Data

Sep. 30, 2005 (JP) ............... 2005-286075

(51) Int. Cl.
*B60W 10/04* (2006.01)
*F16H 61/40* (2006.01)
(52) U.S. Cl. ........................ 477/115; 477/68
(58) Field of Classification Search ............ 477/52, 477/68, 115; 74/731.1, 732.2, 733.1; 60/327, 60/431, 449; 180/53.4
See application file for complete search history.

(56) References Cited

U.S. PATENT DOCUMENTS

| | | | | | |
|---|---|---|---|---|---|
| 3,932,993 | A | * | 1/1976 | Riedhammer | 60/431 |
| 4,395,199 | A | * | 7/1983 | Izumi et al. | 417/53 |
| 4,497,223 | A | * | 2/1985 | Maruyama et al. | 477/68 |
| 4,956,972 | A | * | 9/1990 | Sasajima et al. | 60/327 |
| 4,976,169 | A | * | 12/1990 | Sasajima et al. | 60/449 |
| 6,379,282 | B1 | * | 4/2002 | Aoki | 477/109 |
| 6,675,577 | B2 | | 1/2004 | Evans | |

FOREIGN PATENT DOCUMENTS

JP 2002-022006 A 1/2002

* cited by examiner

*Primary Examiner*—Roger Pang
(74) *Attorney, Agent, or Firm*—The Webb Law Firm

(57) ABSTRACT

A load control structure for a work vehicle comprises: set rotation speed detection device for detecting a set rotation of an engine of the work vehicle; actual rotation speed detection device that senses an actual rotational speed of the engine; continuously variable speed change device that receives power from an engine of the work vehicle; speed change position detecting device for detecting a speed change operation position of the continuously variable speed change device; operating device for speed-shifting the continuously variable speed change device; control device for controlling the operation of the operating device; wherein the control device calculates a drop amount of the actual engine rotation speed from the set rotation speed based on the detected information from the set rotation speed detection device and the actual rotation speed detection device, and sets a limit operation position for the continuously variable speed change device based on the calculated drop amount and a correlation data that correlates the actual engine rotation speeds with operating positions of the continuously variable speed change device, and controls the operating device such that the operating position of the continuously variable speed change device moves to the limit operating position based on the set limit operating position and detected information from the speed change position detecting device, and wherein the control device has command device for commanding a change of the correlation data.

8 Claims, 14 Drawing Sheets

(A)

●High to Low (B)

●Low to High

Mechanical servo + 2 speeds

Electronic servo only

Mechanical servo only

SPEED CONTROL STRUCTURE AND METHOD FOR WORK VEHICLE

BACKGROUND OF THE INVENTION

The present invention is directed to a load control structure and the control method for a work vehicle.

Such a work vehicle conventionally has, among other things, set rotation speed detection means for detecting a set rotation of an engine of the work vehicle; actual rotation speed detection means that senses an actual rotational speed of the engine; continuously variable speed change device that receives power from an engine of the work vehicle; speed change position detecting means for detecting a speed change operation position of the continuously variable speed change device; operating means for speed-shifting the continuously variable speed change device; control means for controlling the operation of the operating means.

In the load control mechanism mentioned above, the control means controls the control means for controlling the continuously variable speed change device based on the drop amount of the engine rotation speed from a set rotation speed so as to operate the continuously variable speed change device to a speed position in accordance with the drop amount. (See, for example, JP2002-22006.)

In the above structure, the continuously variable speed change device is merely operated to a speed position in accordance with the drop amount from a set engine rotation speed. Thus, it was difficult to have a satisfactory load control that is good for different engine loads that differ depending on operating conditions.

SUMMARY OF THE INVENTION

An object of the present invention is to provide advantageous load control for different engine loads that differ depending on different operating conditions.

Accordingly, a load control structure for a work vehicle in accordance with the present invention comprises: set rotation speed detection means for detecting a set rotation of an engine of the work vehicle; actual rotation speed detection means that senses an actual rotational speed of the engine; continuously variable speed change device that receives power from an engine of the work vehicle; speed change position detecting means for detecting a speed change operation position of the continuously variable speed change device; operating means for speed-shifting the continuously variable speed change device; control means for controlling the operation of the operating means; wherein the control means calculates a drop amount of the actual engine rotation speed from the set rotation speed based on the detected information from the set rotation speed detection means and the actual rotation speed detection means, and sets a limit operation position for the continuously variable speed change device based on the calculated drop amount and a correlation data that correlates the actual engine rotation speeds with operating positions of the continuously variable speed change device, and controls the operating means such that the operating position of the continuously variable speed change device moves to the limit operating position based on the set limit operating position and detected information from the speed change position detecting means, and wherein the control means has command means for commanding a change of the correlation data.

DETAILED DESCRIPTION OF PREFERRED EMBODIMENTS

Figure 1:
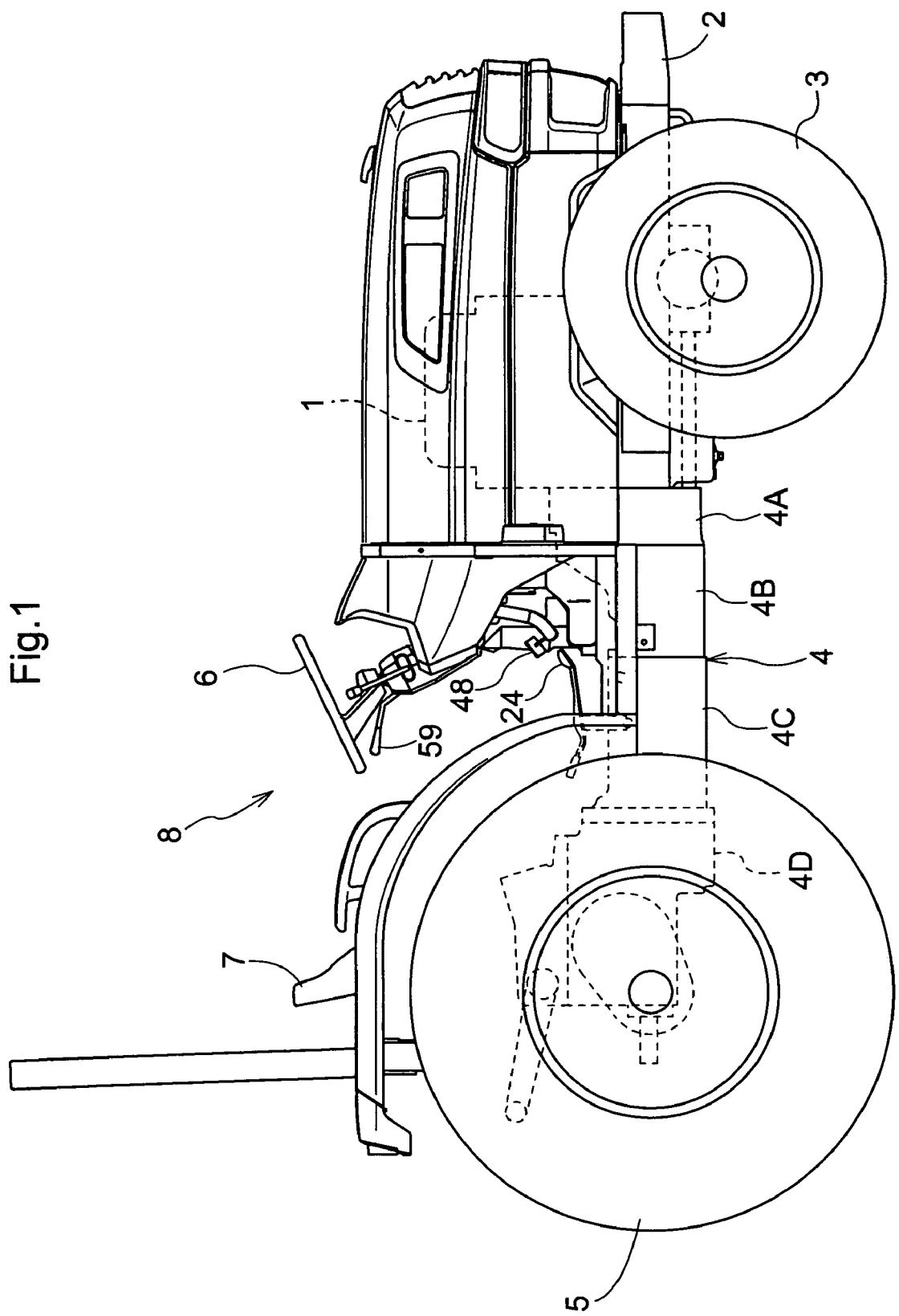
FIG. 1 is a side view of a tractor as an example of a work vehicle.

The entire side view of the tractor as an example of a work vehicle is shown in FIG. 1. This tractor has a front frame 2 that supports the engine 1 via a vibration insulator, front wheels 3 supported to either side of the front frame 2, a transmission case 4 that also functions as a frame connected with the engine 1, and the rear wheels 5 provided to either side of the transmission case 4. The work vehicle has the operator's section 8 equipped with a steering wheel 6, the operator's seat 7, etc. above a transmission case 4. The tractor has several sensors as described below. These sensors are known and conventional such as rotation sensors, which can be of optical or magnetic type or otherwise, and will not be described in detail below.

Figure 2:
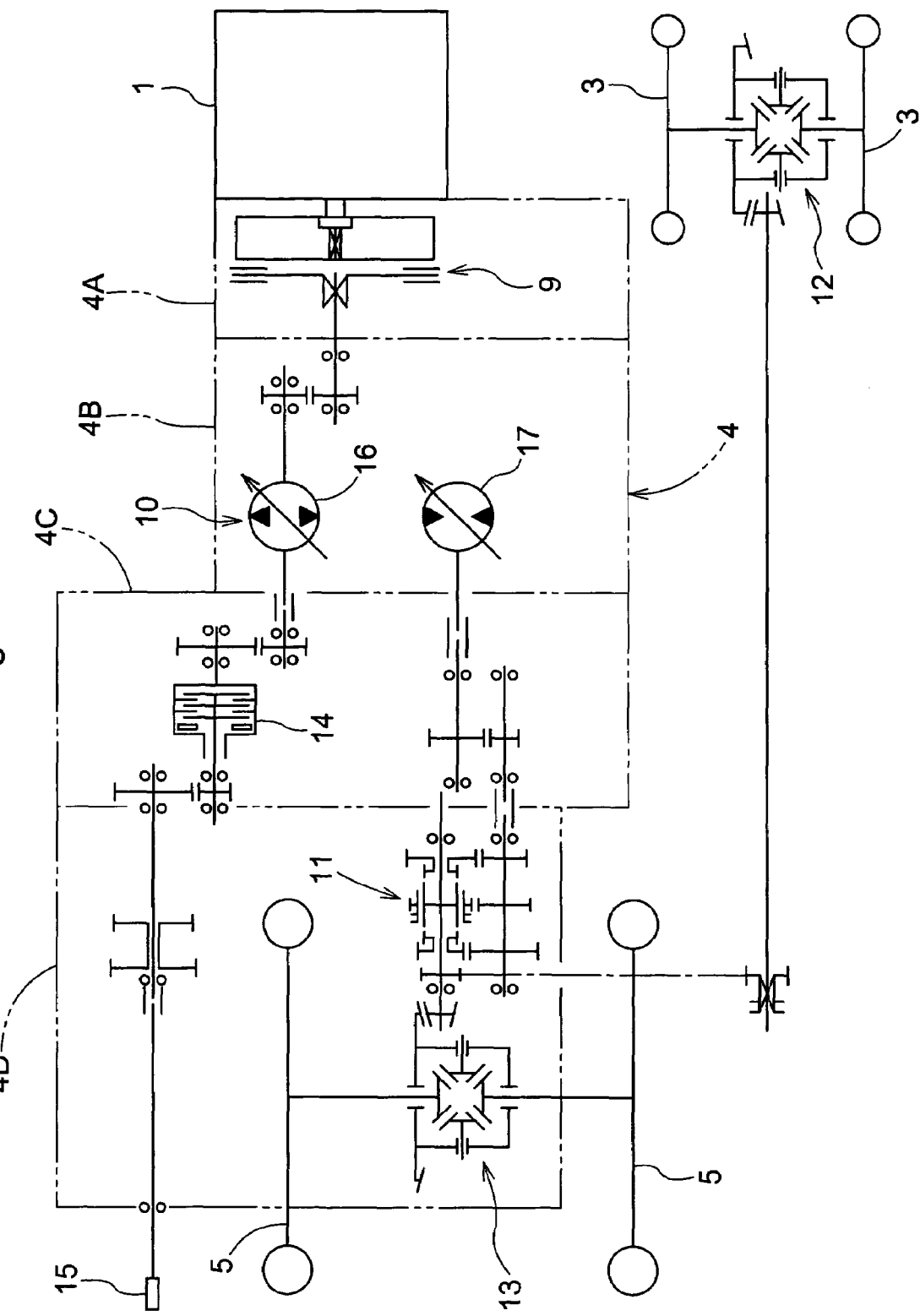
FIG. 2 is a schematic diagram showing the drive train of the tractor.
Figure 3:
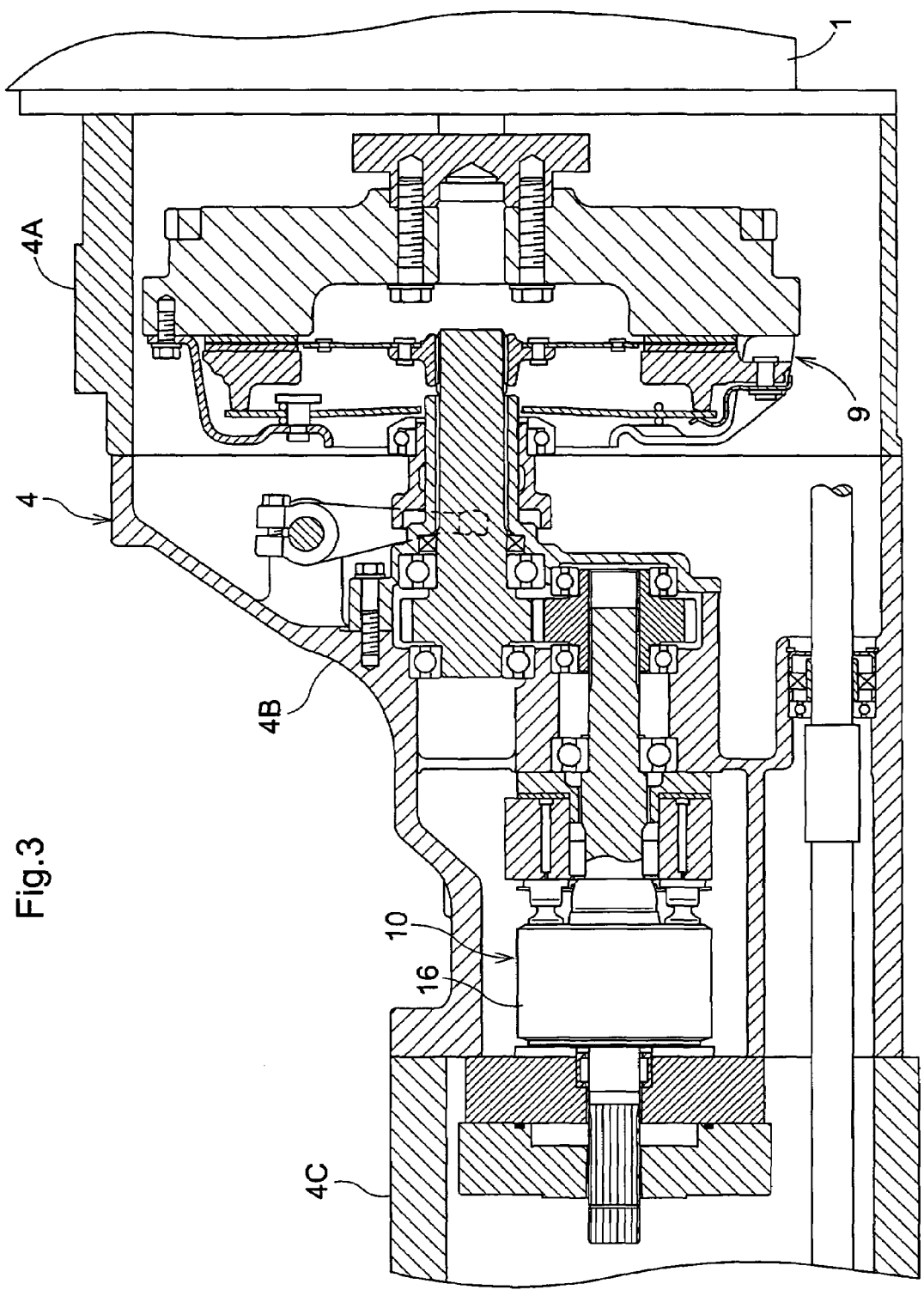
FIG. 3 is a sectional side view showing a part of the drive train of the tractor.
Figure 4:
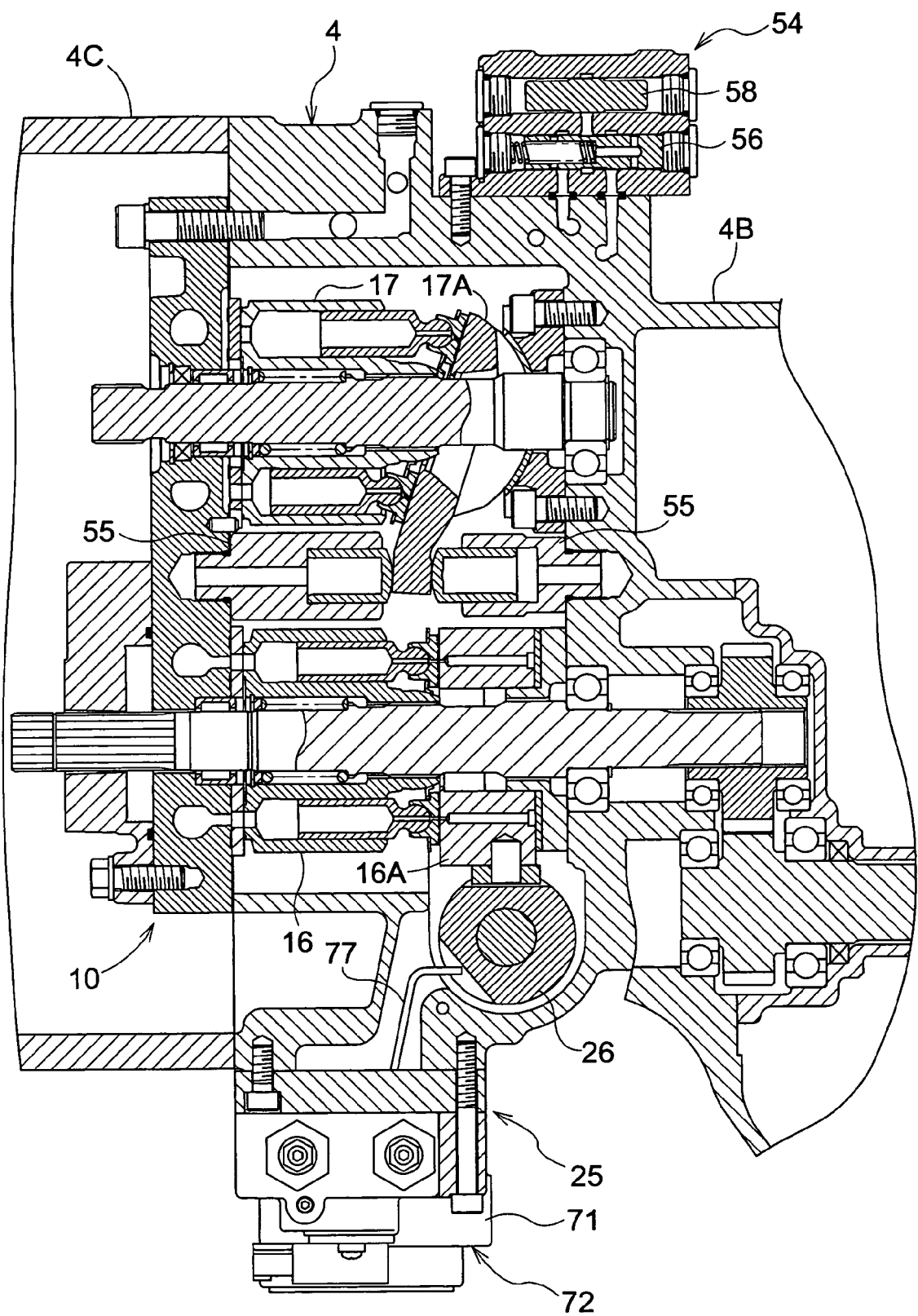
FIG. 4 is a sectional plan view showing a part of the drive train of the tractor.

As shown in FIGS. 2-4, the power from the engine 1 is transmitted to the hydrostatic continuously variable speed change device (an example of a continuously variable speed change device) 10 which functions as a main speed change apparatus through the dry-type main clutch 9 etc. The driving power from the hydrostatic continuously variable speed change device 10 is transmitted to the right and left front wheels 3 and the right and left rear wheels 5 through the gear type speed change device (an example of a stepwise change speed device) 11 which functions as an auxiliary speed change device that can be shifted to three speed positions, high, medium, and low speed positions, the differential gear 12 for front wheels, or the differential gear 13 for rear wheels. The power for an operation taken from the hydrostatic type continuously variable speed change device 10 is transmitted to power take off axis 15 via hydraulic operation clutch 14 etc.

Transmission case 4 is formed by connecting the four casing parts: the first casing part 4A that houses the main clutch 9 etc., the second casing part 4B that houses hydrostatic type continuously variable speed change device 10 etc., the third casing part 4C that houses operation clutch 14 etc., and the fourth casing part 4D that houses gear type speed change device 11 etc.

As shown in FIGS. 2-5, hydrostatic type continuously variable speed change device 10 has a axial plunger type variable displacement pump 16, axial plunger type variable displacement motor 17, etc. which are housed in the second casing part 4B, where the power from variable displacement pump 16, which is not speed-changed, is outputted as power for an operation and the speed-changed power from variable displacement motor 17 is outputted as power for traveling. The charge oil from charge pump 21 driven by the engine power is supplied to closed circuit 20 via charge oil path 22, check valve 23, etc. which is formed by connecting the variable displacement pump 16 and the variable displacement motor 17 with the first oil path 18 and the second oil path 19.

As shown in FIGS. 1, and 4-6, this tractor is equipped, in its operator's station 8, with a servo control mechanism 25 with which swash plate (referred to as a pump swash plate hereinafter) 16A of variable displacement pump 16 is operated, based on operation of the speed change pedal (an example of speed change operating element) 24 which is urged toward its neutral position.

Figure 5:
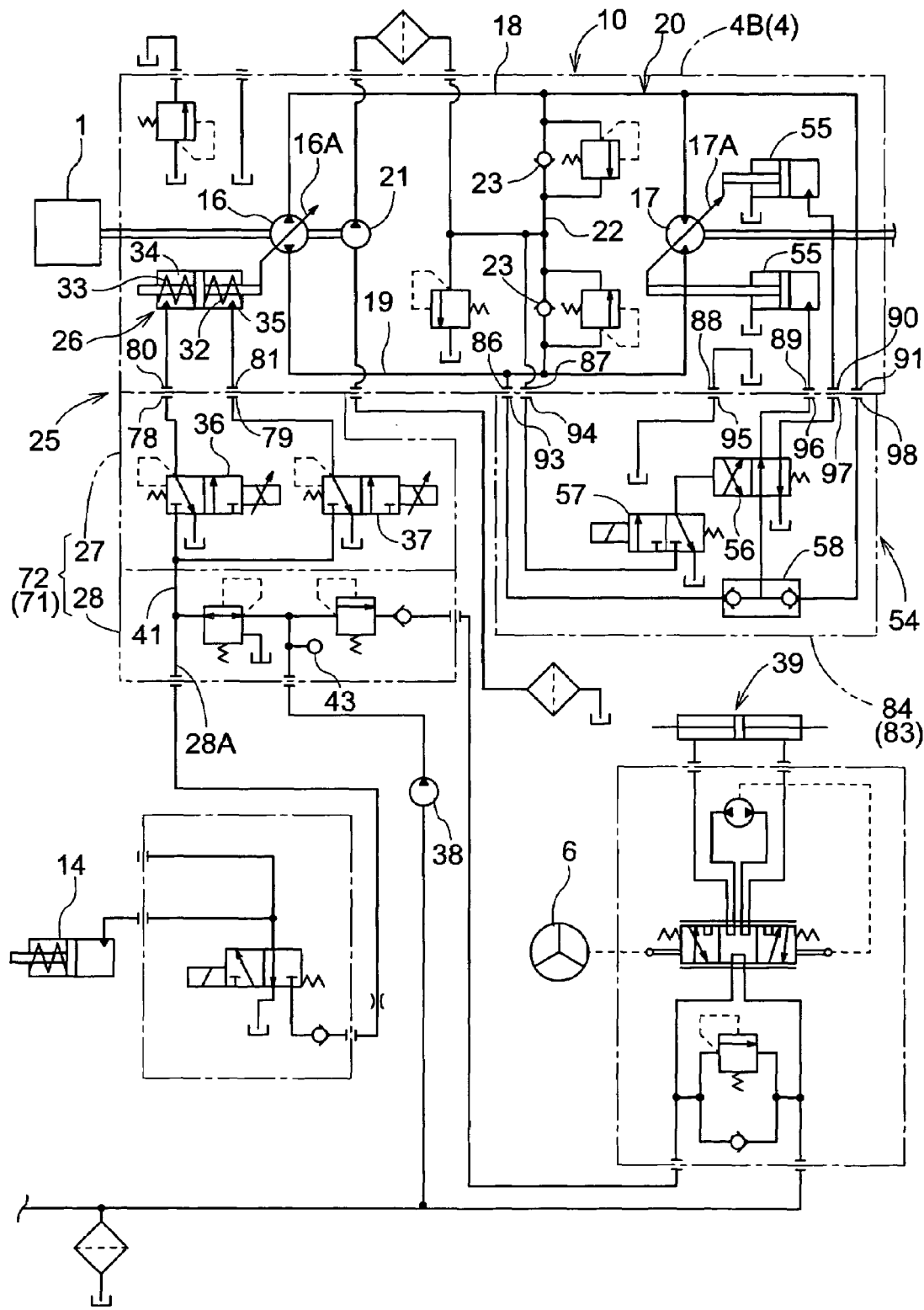
FIG. 5 is a diagram showing the hydraulic circuit.
Figure 6:
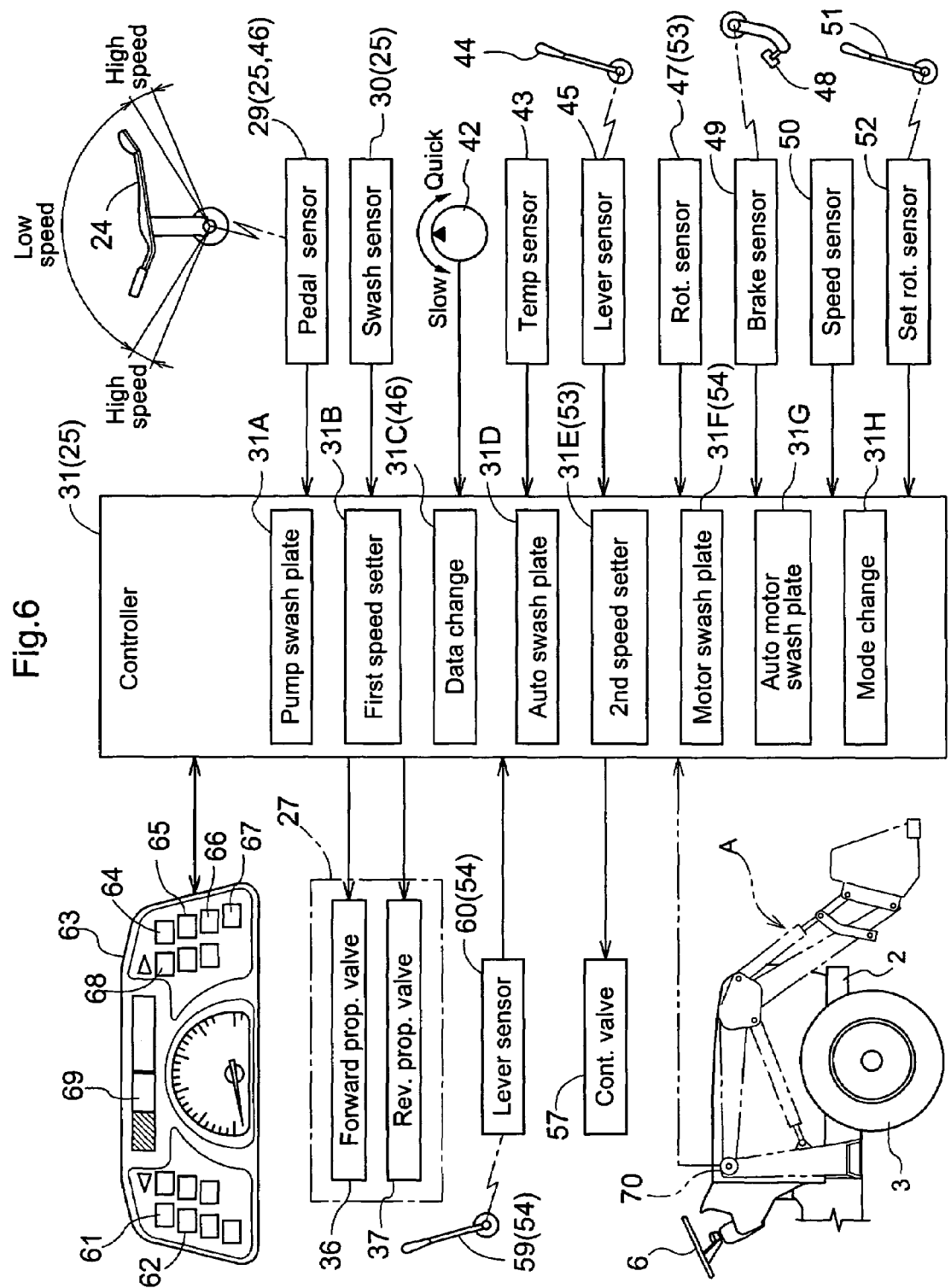
FIG. 6 is a block diagram showing the control structure.

As shown in FIGS. 4-6, the servo control mechanism 25 has hydraulic pump cylinder 26 for continuously operating the pump swash plate 16A (an example of a operating means), a servo valve 27 which regulates flow of the hydraulic fluid to the hydraulic pump cylinder 26, a regulator valve 28 that maintains the hydraulic pressure to the serve valve 27 at a predetermined value, a pedal sensor (an example of an operation position detecting means) 29 which has a potentiometer to detect the operated position of the speed change pedal 24, and a swash plate sensor (an example of a speed change position detecting means) 30 which has a potentiometer which detects the operation position of pump swash plate 16A from the amount of operation of the pump cylinder 26, and a control device (an example of a control means) 31 which has a microcomputer to which detected information from the sensors such as the pedal sensor 29, the swash plate sensor 30, etc. are inputted.

The pump cylinder 26 is housed in the second casing part 4B with a forward travel decelerating spring 32 and reverse travel decelerating spring 33 that urge the swash plate 16A toward its neutral position. As hydraulic fluid is supplied to hydraulic chamber 34 for forward travel gear change, the pump swash plate 16A is operated to a forward travel speed-increase (or accelerating) direction against the urging force of the forward travel decelerating spring 32. As hydraulic fluid is supplied to the hydraulic chamber 35 for reverse travel speed changes, pump swash plate 16A is operated to a reverse travel speed-increase direction against the travel decelerating spring 33.

The servo valve 27 has an electromagnetic proportional valve 36 for forward travel to control a flow of hydraulic fluid to the hydraulic chamber 34 for forward travel of the pump cylinder 26 and an electromagnetic proportional valve 37 for reverse travel which controls a flow of the hydraulic fluid to the hydraulic chamber 35 for the reverse travel speed changes of the pump cylinder 26. The regulator valve 28 distributes the hydraulic fluid fed from supply pump 38 for power steering to operation clutch 14 and hydraulic power steering device 39 with pressure suitable for each operation. The supply oil path 41 to servo valve 27 is connected to the pressure port 28A of the regulator valve 28 to which the supply oil path 40 to operation clutch 14 is connected.

Control device 31 has at least a MPU, memory, and other known hardware required to perform communication function, and other functions and algorithms described in the specification. As shown in FIG. 6, the control device 31 has the map data (an example of correlation data) which correlates the operated position (or actuation position) of speed change pedal 24, with the operation position of pump swash plate 16A, and pump swash plate control means 31A which has the control program which operates pump swash plate 16A by controlling the operation of proportional valve 36 for forward travel, or proportional valve 37 for reverse travel based on the map data and detected information or signals from the pedal sensor 29, detected information from the swash plate sensor 30, etc.

Figure 7:
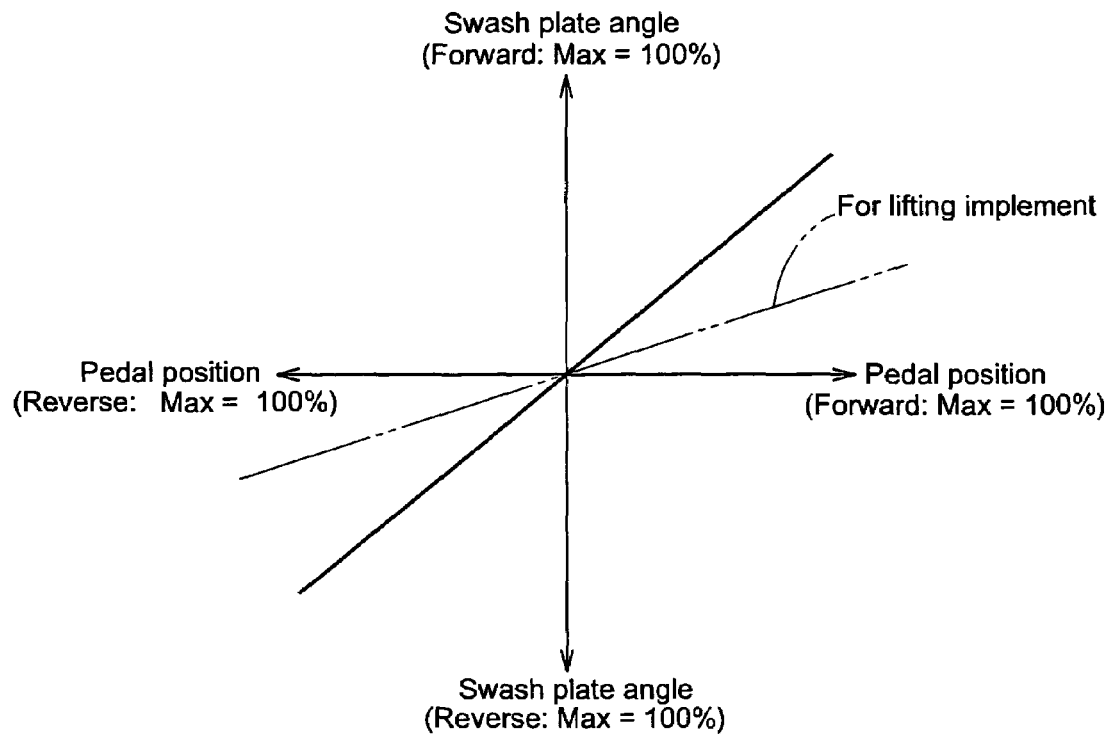
FIG. 7 is a graph showing a correlation between the operated positions of the speed change pedal and the operated positions of the pump swash plate.

The map data of pump swash plate control means 31A makes the correspondence between the operated position of speed change pedal 24 and the operation position of pump swash plate 16A such that the greater the amount of operation from the neutral position of speed change pedal 24 to a forward travel speed-increase direction is, the greater the amount of operation from the neutral position of pump swash plate 16A to a forward travel speed-increase direction is, and such that the greater the amount of operation from the neutral position of speed change pedal 24 to a reverse travel speed-increase direction is, the greater the amount of operation from the neutral position of pump swash plate 16A to a reverse travel speed-increase direction is (See FIG. 7).

The control program of pump swash plate control means 31A sets the operation position of pump swash plate 16A corresponding to the operated position of speed change pedal 24 which pedal sensor 29 detected, as the target operation position of pump swash plate 16A based on the stored map data and the detected information from pedal sensor 29.

Based on the set target operation position and the detected information from swash plate sensor 30, the operation of the proportional valve 36 for forward travel and the proportional valve 37 for reverse travel is controlled such that the target operation position of pump swash plate 16A and the actual operation position come into agreement. By this control operation, the vehicle can be moved forward or reversed at the speed in accordance with the operated position of speed change pedal 24.

That is, the servo control mechanism 25 is an electronically controlled type where the pump swash plate control means 31A controls the operation of proportional valve 36 for forward travel, or proportional valve 37 for reverse travel to operate the pump cylinder 26 in order to operate the pump swash plate 16A of the hydrostatic type continuously variable speed change device 10 based on detected information from pedal sensor 29, and detected information from swash plate sensor 30. The servo control mechanism 25 drives pump cylinder 26 directly with the output pressure of the proportional valve 36 for forward travel or proportional valve 37 for reverse travel which goes through pressure port 28A of regulator valve 28 (direct-acting type).

A stable servo pilot pressure can be obtained and operation control of pump cylinder 26 can be performed with sufficient accuracy, compared with an arrangement where the pump cylinder 26 is driven with the output pressure from charge oil path 22 where pressure changes due to the pressure fluctuation in closed circuit 20 of hydrostatic type continuously variable speed change device 10, or changes in engine rotation rate. As a result, vehicle speed control which effects forward travel or reverse travel at speed in accordance with the operated position of speed change pedal 24 with sufficient accuracy based on detected information from pedal sensor 29, and detected information from swash plate sensor 30 while utilizing a direct-acting type servo control mechanism 25, which is relatively inexpensive.

The control device 31 has; an operation program which computes the deviation between the target operation position of the pump swash plate 16A determined by the pump swash plate control means 31A and the actual operation position based on the target operation position of pump swash plate 16A and the detected information from swash plate sensor 30; a plurality of map data (an example of correlation data) which correlates the deviation of the target operation position of pump swash plate 16A with the actual operation position and the operating speed of pump swash plate 16A; and the first operating speed setting means 31B has the control program which sets the target operating speed of pump swash plate 16A based on those map data and calculated result of the operation program.

Figure 8:
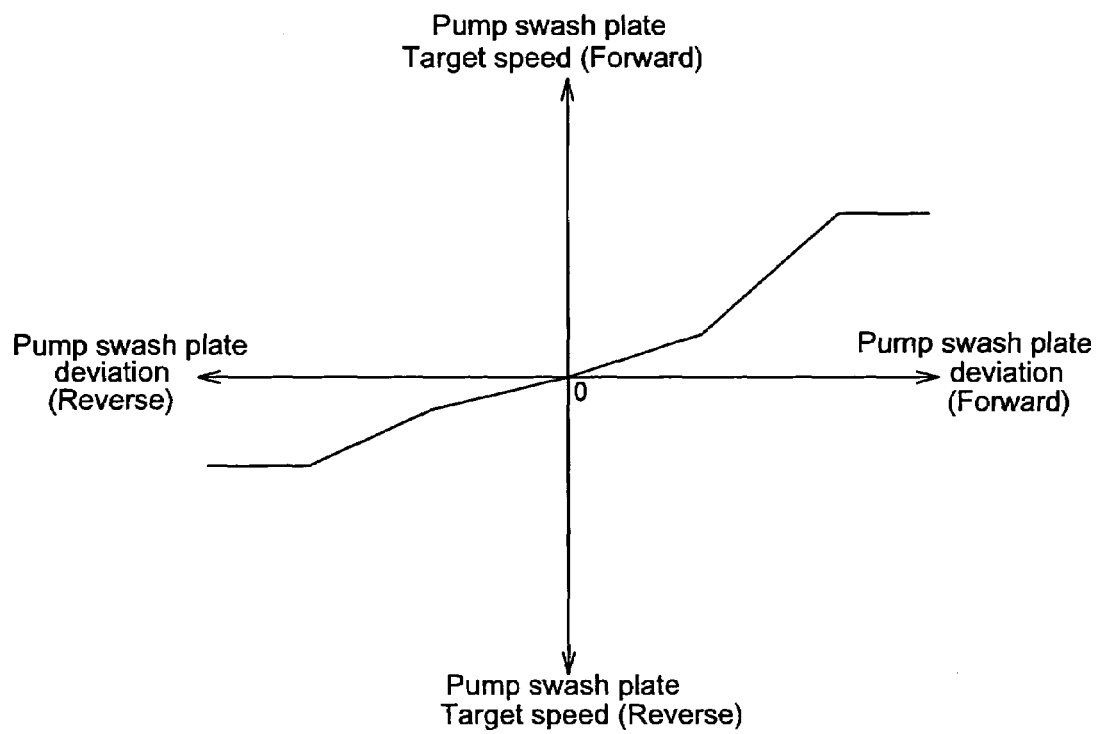
FIG. 8 is a graph showing a correlation between deviations of the swash plate and target operation speeds.

Each map data of the first operating speed setting means 31B correlates the deviation of pump swash plate 16A with the operating speed of pump swash plate 16A (refer to FIG. 8) such that when there is a large deviation between the actual operation position of pump swash plate 16A detected by swash plate sensor 30 and the target operation position of pump swash plate 16A determined by the pump swash plate control means 31A, the operating speed of the pump swash plate 16A becomes greater, and such that operating speed of pump swash plate 16A for a given deviation of the pump swash plate 16A in reverse travel is less than the operating speed of pump swash plate 16A for a given deviation of pump swash plate 16A in a forward travel.

The control program of the first operating speed setting means 31B is set up such that the operating speed of pump swash plate 16A corresponding to the deviation of computed pump swash plate 16A is set as the target operating speed of pump swash plate 16A based on the map data and the calculation result of the operation program. And the set target operating speed is output to the pump swash plate control means 31A.

In vehicle speed control, the control program of the pump swash plate control means 31A controls the operation of the proportional valve 36 for forward travel, or proportional valve 37 for reverse travel such that the pump swash plate 16A is operated at the target operating speed set by the first operating speed setting means 31B. By this control operation, hunching can be controlled while improving response property of the pump swash plate 16A to the operation of speed change pedal 24. As a result, the vehicle speed can reach the speed set by the operated position of speed change pedal 24 quickly and accurately. Since the operating speed of pump swash plate 16A in reverse travel is less than the operating speed of pump swash plate 16A during a forward travel, and the speed change operation of the hydrostatic type continuously variable speed change device 10 in a reverse travel is performed more gradually compared with a speed change operation of the hydrostatic type continuously variable speed change device 10 during a forward travel, it becomes easy to perform speed change operation of hydrostatic type continuously variable speed change device 10 during a reverse travel when it is difficult to have a sense of speed compared with during a forward travel.

The control device 31 has data change means 31C provided with the control program which changes the map data which the first operating speed setting means 31B uses. As described below, data change means 31C is set up such that the map data which the first operating speed setting means 31B uses is changed appropriately according to various situations.

The data change means 31C changes the map data which correlates the deviation of pump swash plate 16A with the operating speed of pump swash plate 16A based on the operated position of regulation dial (an example of an operator-manipulated control) 42 which has a potentiometer in the operator's station 8 such that as the regulation dial 42 is operated more toward the quick side from the reference position, operation of pump swash plate 16A is performed more promptly by changing the map such that the deviation of pump swash plate 16A corresponds with the operating speed of pump swash plate 16A such that the operating speed of pump swash plate 16A for a given deviation of the pump swash plate 16A becomes more rapid. Also, as the regulation dial 42 is operated more toward a slow side from the reference position, the operating speed of pump swash plate 16A to the deviation of pump swash plate 16A is less so that the operation of pump swash plate 16A is performed more gradually.

That is, by operating the regulation dial 42, a response to a gear change operation of the hydrostatic type continuously variable speed change device 10 by speed change pedal 24 may be changed according to the liking of a driver, resulting in an improved speed change characteristics.

The data change means 31C changes the map data based on detected information from oil temperature sensor 43 by which the temperature of the hydraulic fluid supplied to regulator valve 28 is detected, such that operating speed of pump swash plate 16A is correlated with a given deviation of pump swash plate 16A so that the operating speed of pump swash plate 16A for the deviation of pump swash plate 16A is gradual in response to a fall of oil temperature so that the lower the temperature of hydraulic fluid is, more gradually the operation of pump swash plate 16A is performed.

That is, the system takes into consideration that the viscosity of hydraulic fluid becomes high and the response of pump swash plate 16A becomes more sluggish with a fall of the hydraulic fluid temperature. The target operating speed of pump swash plate 16A is set lower with a lower temperature of hydraulic fluid. This can help prevent hunching resulting from the fall in the response of the pump swash plate 16A, which is more likely to happen when temperature of hydraulic fluid is not taken into consideration and when the temperature of hydraulic fluid is low.

The data change means 31C changes the map data which correlates the deviation of pump swash plate 16A with the operating speed of pump swash plate 16A based on detected information from sub-gear change sensor (an example of a gear ratio detection means) 45 which has a potentiometer which detects the gear ratio of the gear type speed change device 11 based on the operation position of sub-gearshift lever 44 in the operator's station 8, such that the higher the gear ratio of the gear type speed change device 11 is, the greater is the speed at which the operation of pump swash plate 16A is performed. Therefore, the means 31C modifies the map that correlates the deviation of pump swash plate 16A with the operating speed of pump swash plate 16A such that the operating speed of pump swash plate 16A for a given deviation of pump swash plate 16A is greater in response to increase in the gear ratio of the gear type speed change device 11.

That is, the target operating speed of pump swash plate 16A is set at a higher speed in consideration of the fact that the reaction to operation of pump swash plate 16A becomes slower, as the gear ratio of gear type speed change device 11 is set to the higher speed side. Thus, irrespective of the gear ratio of gear type speed change device 11, the response during a gear change operation of the hydrostatic type continuously variable speed change device 10 by speed change pedal 24 is consistent.

The data change means 31C changes the map to be used to data which correlates the deviation of pump swash plate 16A with the operating speed of pump swash plate 16A such that the slower the operating speed of speed change pedal 24 is, the more gradually the pump swash plate 16A is operated, based on the detected information from the operating speed detection means 46 which detects the operating speed of speed change pedal 24, such that with a decrease in the operating speed of speed change pedal 24, the operating speed of the pump swash plate 16A for a given deviation of pump swash plate 16A becomes more gradual. The operating speed of speed change pedal 24 is obtained by differentiating the output of pedal sensor 29 with respect to time. Therefore, the detection means 46 is considered to have the pedal sensor 29 and the control device 31.

As a result, even if the speed change pedal 24 is operated very slowly, the movement of the pump swash plate 16A lags behind the operation of speed change pedal 24. Thus, since the possibility that operation of pump swash plate 16A follows the operation of speed change pedal 24 causing a stepwise speed change can be avoided, a smooth gear change operation of hydrostatic type continuously variable speed change device 10 by speed change pedal 24 can be performed irrespective of the operating speed of speed change pedal 24.

The operating speed detection means 46 has the pedal sensor 29 and the operation program, which data change means 31C has, to calculate the operating speed of speed change pedal 24 based on detected information from the pedal sensor 29.

The data change means 31C changes the map data to be used into the map data which correlates the deviation of pump swash plate 16A with the operating speed of pump swash plate 16A based on detected information from swash plate sensor 30 such that when it is detected that the operation position of pump swash plate 16A is near the neutral position or at the neutral position, operation of pump swash plate 16A is performed gently so that the operating speed of pump swash plate 16A for a given deviation of pump swash plate 16A is restricted to the low speed side.

As a result, when pump swash plate 16A is located near the neutral position or at the neutral position, even if the speed change pedal 24 is suddenly depressed, since pump swash plate 16A is not quickly operated in the speed increase direction with the step in operation, the pump swash plate 16A is operated in the speed increase direction gently. Thus even if the step in operation of the speed change pedal 24 is carried out very rapidly, a smooth start is ensured without a sudden start or a sudden acceleration from a very slow speed.

The data change means 31C changes the used map data which correlates the deviation of pump swash plate 16A with the operating speed of pump swash plate 16A based on the detected information from rotation sensor (an example of a load detection means) 47 which detects the engine rotational speed, and the target operation position of pump swash plate 16A set up by pump swash plate control means 31A, such that when the target operation position of pump swash plate 16A is set to the low speed side when the engine rotational speed is low, operation of pump swash plate 16A is performed quickly, such that, in response to the fall of the engine rotational speed, the operating speed of pump swash plate 16A for a given deviation of pump swash plate 16A becomes greater. The map data is changed such that when it is detected that the target operation position of pump swash plate 16A was set to the high speed side when the engine rotational speed is raising, the operation of pump swash plate 16A is performed gently so that the operating speed of pump swash plate 16A for a given deviation of the pump swash plate 16A becomes slow in response to the rise of the engine rotational speed.

If the speed change pedal 24 is operated to the decelerating side when the engine rotational speed is low due to increase of traveling load etc., the pump swash plate 16A is operated quickly to the decelerating direction in response to the operation, mitigating the excess engine load. This reduces the problem of an engine stall in spite of the speed change pedal 24 operated in the decelerating direction because reduction of the engine load is too slow due to slow response of the hydrostatic type continuously variable speed change device 10. When the speed change pedal 24 is operated to the accelerating side when the engine rotational speed is raising due to reduction of traveling load etc., since operation to the speed-increase direction of pump swash plate 16A based on the operation is performed gently, the rapid increase of the vehicle speed, resulting from the rapid speed increase operation of the pump swash plate 16A with the increase in the engine rotational speed, is avoided. That is, gear change operation of hydrostatic type continuously variable speed change device 10 by speed change pedal 24 can be performed well irrespective of change in the engine rotational speed.

The data change means 31C changes the map data which correlates the deviation of pump swash plate 16A with the operating speed of pump swash plate 16A based on detected information from the brake sensor (an example of a braking detecting means) 49 which has a potentiometer which detects the operation of brake mechanism (not shown) from the operation position of brake pedal 48 in the operator's station 8, such that when brake mechanism is carrying out the braking operation, operation to the decelerating direction of pump swash plate 16A is performed promptly such that the operating speed of pump swash plate 16A for a given deviation of pump swash plate 16A becomes greater, taking into consideration the fall of the vehicle speed by the braking operation of brake mechanism.

This prevents the interference between the hydrostatic type continuously variable speed change device 10 and the brake mechanism during the braking operation when the step in operation of speed change pedal 24 is ceased and the step in operation of the brake pedal 48 is performed. Thus this helps increase operating life of the hydrostatic type continuously variable speed change device 10 as well as the brake mechanism.

The data change means 31C changes the map data which correlates the deviation of pump swash plate 16A with the operating speed of pump swash plate 16A based on the detected information from the vehicle speed sensor (speed detecting means) 50 which detects the vehicle speed from the output rotational speed of gear type speed change device 11, such that when the vehicle speed is low, the operating speed of pump swash plate 16A for a given deviation of pump swash plate 16A is performed slowly so that operation of pump swash plate 16A is gradual in response to the fall of the vehicle speed.

When traveling at low speed, the response of pump swash plate 16A to an operation of speed change pedal 24 becomes less sensitive, making it easier to perform an inching operation of the vehicle speed required at low speed.

The data change means 31C changes the map data which correlates the deviation of the pump swash plate 16A with the operating speed of the pump swash plate 16A based on detected information from the swash plate sensor 30, and the target operation position of pump swash plate 16A set by the pump swash plate control means 31A, such that when the target operation position of the pump swash plate 16A is set to the speed increase side relative to the actual operation position, operation of pump swash plate 16A is performed more gently, and such that when the target operation position of pump swash plate 16A is set to the slowdown side relative to the actual operation position, operation of pump swash plate 16A is performed promptly, and such that when the neutral position is between the target operation position of pump swash plate 16A and the actual operation position, operation of pump swash plate 16A is performed much more promptly.

Therefore, depending on the relationship of the target operation position of pump swash plate 16A, and the actual operation position, the operating speed of pump swash plate 16A for a given deviation of pump swash plate 16A changes.

The responses to the speed increase operation and slowdown operation of the hydrostatic type continuously variable speed change device 10 by speed change pedal 24 may be made different by this method. Since the increase of the engine load by a speed increase operation of hydrostatic type continuously variable speed change device 10 is reduced and the engine load by a slowdown operation of hydrostatic type continuously variable speed change device 10 is reduced, an engine stall due to a gear change operation of the hydrostatic type continuously variable speed change device 10 by the speed change pedal 24 during high load can be effectively prevented. Since the operation delay of the pump swash plate 16A in response to an operation of the speed change pedal 24 is prevented, speed change operation of the hydrostatic type continuously variable speed change device 10 in the forward or the reverse direction by the speed change pedal 24 can be performed comfortably.

The data change means 31C changes the map data which correlates the deviation of the pump swash plate 16A with the operating speed of pump swash plate 16A based on detected information from swash plate sensor 30, and the target operation position of the pump swash plate 16A set by the pump swash plate control means 31A such that at the start of the vehicle movement where the pump swash plate 16A is operated in the speed increase direction from the neutral position, the operation of pump swash plate 16A is performed gently, such that the operating speed of pump swash plate 16A for a given deviation of pump swash plate 16A becomes slower at the start of travel and such that when the vehicle is stopped where a slowdown operation of the pump swash plate 16A is carried out from a speed increase position to the neutral position, operation of the pump swash plate 16A is performed with greater speed, so that at the time of the vehicle stop, the operating speed of pump swash plate 16A for a given deviation of pump swash plate 16A becomes quicker.

This allows the changes in the response to the traveling start and a traveling stop by operation of speed change pedal 24. This also helps prevent a possible sudden acceleration at the start of the vehicle movement.

As the map data of the first operating speed setting means 31B, a map data for the forward travel for the gear change operating speed at the time of a forward travel, and a map data for the reverse travel for the gear change operating speed at the time of a reverse travel may be separately provided so that the data change means 31C has different map data to be used based on detected information from the pedal sensor (forward reverse travel detection means) 29.

When the forward travel decelerating spring 32 and the reverse travel decelerating spring 33 perform neutral return operation (slowdown operation) of the pump swash plate 16A, the inertia at the time of a trailer operation etc. may make it hard to perform the slowdown operation toward the neutral position of pump swash plate 16A despite the slowdown operation of speed change pedal 24.

Thus despite the deceleration operation of the speed change pedal 24 based on detected information from the pedal sensor 29, and detected information from the swash-plate sensor 30, when it is detected that deceleration operation of the pump swash plate 16A with the forward travel decelerating spring 32 or the reverse travel decelerating spring 33 is not performed, the pump swash plate control means 31A controls the actuation of the proportional valve 36 for forward travel or the proportional valve 37 for reverse travel on the side opposite to the side used to actuate the pump swash plate 16A to the present actuation position. Thus the pump cylinder 26 is forced to operate in the direction in which deceleration operation of the pump swash plate 16A is carried out toward the neutral position.

As a result, even if the pump swash plate 16A does not decelerate despite the rate at which the speed change pedal 24 is operated is slowed down due to inertia for example during a trailer operation etc., deceleration operation of the pump swash plate 16A can be carried out by a forced operation of the pump cylinder 26 by the operation control of the proportional valve 36 for forward travel or the proportional valve 37 for reverse travel by the pump swash plate control means 31A.

Figure 9A:
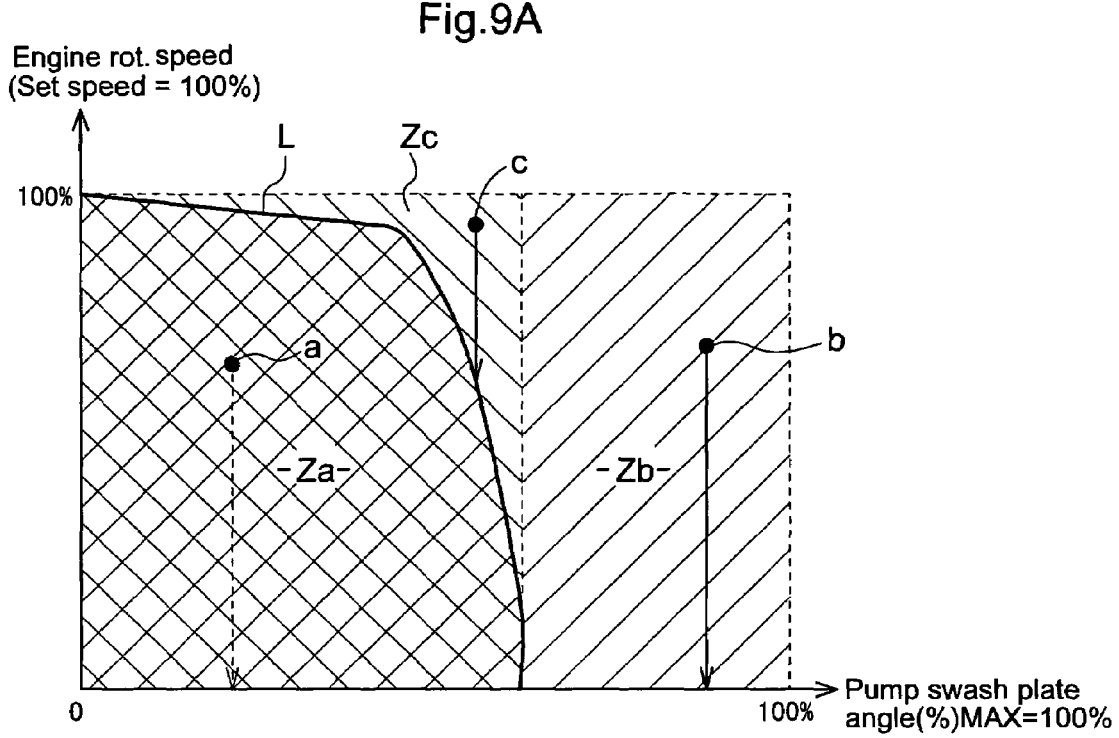
FIG. 9 is a graph showing a correlation between positions of the swash plate and engine rotation rates.

The engine stall performance of the work vehicle carrying the hydrostatic type continuously variable speed change device 10 is shown in FIG. 9(A). This engine stall performance is determined by the output torque of an engine 1, the pressure of the hydrostatic type continuously variable speed change device 10, and the actuation position (swash-plate angle) of the pump swash plate 16A.

The line L shown in FIG. 9(A) is an engine stall performance line where the engine rotational speed and the shift operation position of the pump swash plate 16A balance at the time of the maximum load to the hydrostatic type continuously variable speed change device 10 at which a high pressure relief of the hydrostatic type continuously variable speed change device 10 releases pressure due to running load.

In FIG. 9(A), the engine rotational speed is shown with respect to the set rotating speed at 100%, and the actuation position of the pump swash plate 16A shown with respect to 100% for the maximum accelerating position (the maximum swash-plate angle).

The engine stall performance of the work vehicle carrying the hydrostatic type continuously variable speed change device 10 is explained with reference to FIG. 9(A). When the operation load for driving implements etc. other than running load is applied to the engine 1 with the pump swash plate 16A held at a certain actuation position, as point a shows, the engine rotational speed and the actuation position of the pump swash plate 16A may go into the region Za inside the engine stall performance line L.

In this case, when the operation load other than running load etc. is stable, even if running load increases, the engine rotational speed does not fall. But if the operation load other than running load etc. increases, the engine rotational speed will drop and an engine 1 will stop or stall.

With the pump swash plate 16A held at a certain actuation or operation position, as shown at point b, when the engine rotational speed and the actuation position of the pump swash plate 16A are located in the region Zb outside the engine stall performance line L, if running load increases, the engine rotational speed will fall and an engine 1 will stop.

With the pump swash plate 16A held at a certain actuation position, when the engine rotational speed and the actuation position of the pump swash plate 16A are located in region Zc, as shown by point c, if the running load increases, the engine rotational speed falls until it arrives at the engine stall performance line L. As it reaches the engine stall performance line L, the engine rotational speed will be stabilized.

The engine stall performance line L is such that as the output of the engine 1 decreases, the actuation position of the pump swash plate 16A for a given engine rotational speed in FIG. 9(A) becomes smaller.

That is, the smaller the output of the engine 1 is, more likely the engine stall becomes due to overload when accelerating by stepping in the speed change pedal 24 when traveling with large running load, or when climbing up a hill.

To solve this problem, as shown in FIG. 6, the control device 31 has the automatic pump swash plate control means 31D which changes the actuation position of the pump swash plate 16A based on the engine load.

Figure 9B:
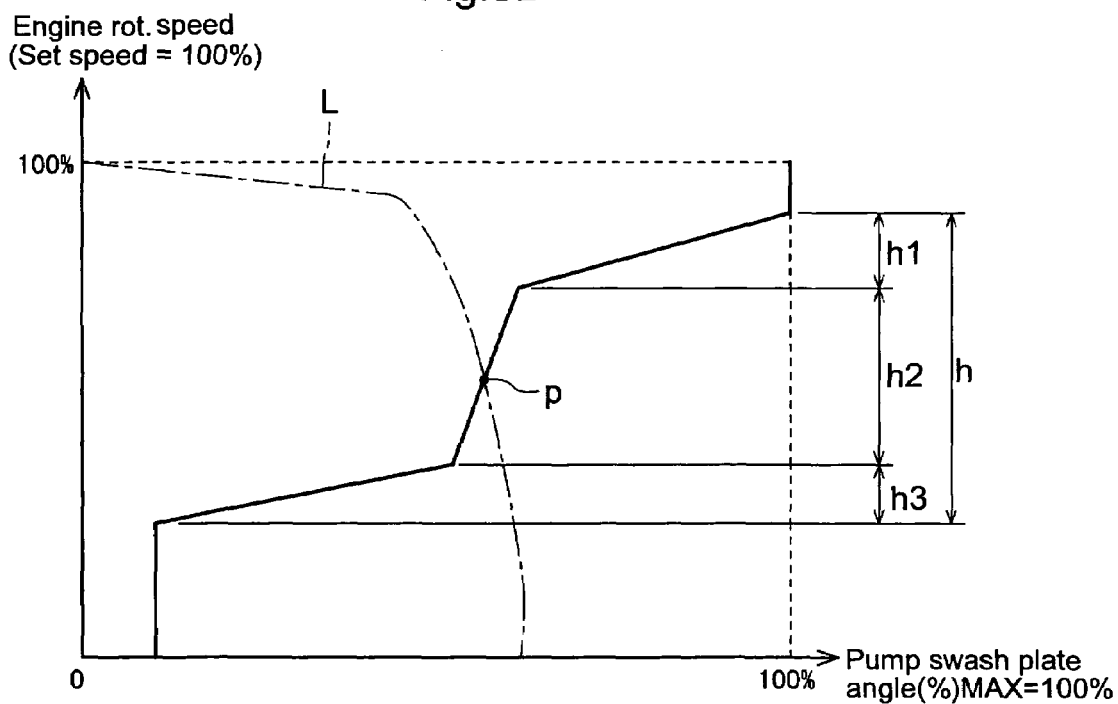

As shown in FIGS. 6 and 9(B), the automatic pump swash plate control means 31D has an operation program which computes the decrease amount (engine drop amount) from the set rotating speed of the engine rotational speed based on detected information from the setting rotation sensor (an example of a set-rotating-speed detection means) 52 which has a potentiometer which detects the set rotating speed of an engine 1 from the actuation position of the accelerator lever 51 in the operator's station 8, and on detected information from the rotation sensor 47, a plurality of map data (an example of correlation data) which correlates the engine rotational speed with the actuation position of the pump swash plate 16A, and, a control program which operates the pump swash plate 16A by controlling actuation of the proportional valve 36 for forward travel, or the proportional valve 37 for reverse travel based on the calculation result and the map data of the operation program.

Each map data of the automatic pump swash plate control means 31D is determined based on the engine stall performance line L. And the engine rotational speed and the actuation position of the pump swash plate 16A are correlated such that when the engine rotational speed falls to the predetermined engine rotation region h, the lower the rotation rate is, the closer the limit operation position is to the neutral position and such that the limit operation position of the pump swash plate 16A is not set at the neutral position (see FIG. 9(B)).

To explain in more detail, as shown in FIG. 9(B), in the first region h1 where the engine drop amount is small among the predetermined engine rotation regions, the engine rotational speed and the actuation position of the pump swash plate 16A are correlated such that the amount of change of the pump swash plate 16A is large for a given amount of change of the engine rotational speed.

In the second region h2 where an engine drop amount is larger than the first region h1, the engine rotational speed and the actuation position of the pump swash plate 16A are correlated such that the amount of change of the pump swash plate 16A is small for a given amount of change of the engine rotational speed and so as to have a stabilizing point p where the engine rotational speed does not fall due to running load.

The engine rotational speed and the actuation position of the pump swash plate 16A are correlated in the third region h3 where an engine drop amount is larger than the second region h2, such that the amount of change of the pump swash plate 16A is large for the given amount of change of the engine rotational speed.

The control program of the automatic pump swash plate control means 31D sets the actuation position of the pump swash plate 16A corresponding to the engine drop amount which the operation program computed as the limit operation position of the pump swash plate 16A based on the calculation result and map data of an operation program, and controls actuation of the proportional valve 36 for forward travel or the proportional valve 37 for reverse travel based on the set limit operation position and detected information from the swash-plate sensor 30, such that the limit operation position of the pump swash plate 16A comes to agreement with the actual actuation position.

That is, with the automatic pump swash plate control means 31D, when the engine rotational speed falls to the first region h1 due to an increase in the engine load, the load control is performed where driving torque is increased while preventing an engine stall by returning the pump swash plate 16A to the slowdown direction greatly, and reducing the engine rotational drop speed.

When the engine rotational speed falls to the second region h2 despite this load control, the load control can be implemented that prevents an engine stall while prioritizing increasing of drive torque by lowering the decelerating operation amount of the swash plate 16A and increasing the drive torque while allowing the operator to feel the engine load. If the load on the engine is running load, the engine rotation rate will stop decreasing below the stabilizing point p once the rate reaches the point p.

Figure 9C:
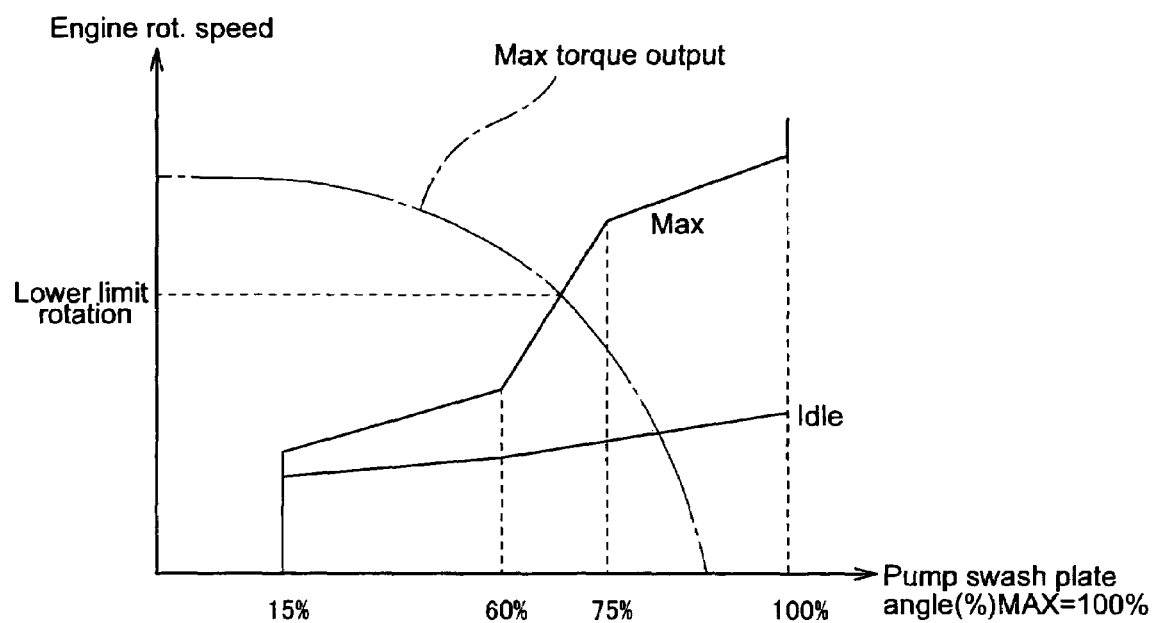

The difference between FIG. 9B and FIG. 9C is that the vertical axis in FIG. 9C represents engine rotation rate. Max indicates the setting of the map data for large load and IDL indicates the setting for map data for light load.

When the engine rotational speed falls to the third region h3 due to load other than running load, for example, from a lift actuation of a liftable implement, load control can be implemented that secures driving torque while giving priority to prevention of the engine stall, by returning the pump swash plate 16A in the slowdown direction by a large amount, and reducing the lowering speed of the engine rotational speed.

With this control, a load control that prevents an engine stall due to overload can be performed during a loader operation where a front loader A is connected to the tractor or during a tilling operation where the tilling apparatus is connected to the tractor etc., even if the operator performs shift operation without consideration to an operation load etc. Thus, improvement in the response in the system may be expected.

Moreover, since the limit operation position of the pump swash plate 16A is never set at the neutral position, the pump swash plate 16A is not returned to the neutral position by this load control. Therefore, a possibility of the pump swash plate 16A returning to the neutral position, and the vehicle unintentionally starting to run backwards by the load control during an uphill climb will be avoided.

The control device 31 has a plurality of map data that correlates the rate of change of the engine rotational speed with the operation speed of the pump swash plate 16A. It has a second operation speed setting means 31E that has a control program which sets the target operation speed for the pump swash plate 16A, based on those map data and detected information from a variation speed detection means 53 that detects the rate of change of the engine rotational speed.

Each map data of the second operation speed setting means 31E correlates the rate of change of the engine rotational speed with the operation speed of the pump swash plate 16A such that the greater the rate of change of the engine rotational speed is, greater the operation speed of the pump swash plate 16A becomes.

The control program of the second operation speed setting means 31E sets the operation speed of the pump swash plate 16A corresponding to the rate of change of the engine rotational speed which the rate of change detection means 53 detected as the target operation speed of the pump swash plate 16A, based on the memorized map data and detected information from the variation speed detection means 53 and the set target operation speed is outputted to the automatic pump swash plate control means 31D.

The control program of the automatic pump swash plate control means 31D controls actuation of the proportional valve 36 for forward travel, or the proportional valve 37 for reverse travel such that the pump swash plate 16A is operated at the target operation speed set by the second operation speed setting means 31E. Thus, a good load control taking into consideration the rate of change of the engine rotational speed is possible. Despite changes in the rate of change of the engine rotational speed, driving comfort is maintained during a drop or increase in engine rotation speed. Moreover, deceleration operation of the pump swash plate 16A to lowering of the engine rotational speed can be performed with sufficient response, and the engine stall resulting from the actuation delay of the pump swash plate 16A can be prevented.

The rate of change detection means 53 has the rotation sensor 47, and the operation program of the second operation speed setting means 31E that computes the rate of change of the engine rotational speed based on detected information from the rotation sensor 47.

The data change means 31C has a control program which changes the map data which is used by the automatic pump swash plate control means 31D and the second operation speed setting means 31E. The data change means 31C changes the map data which the automatic pump swash plate control means 31D uses to a map data that correlates the engine rotational speed with the actuation position of the pump swash plate 16A, based on detected information from the set rotation sensor 52, such that the smaller the set rotating speed of an engine 1, the greater the control amount of the pump swash plate 16A for a given change in the engine rotational speed (see FIG. 9). It also changes the map data, which the second operation speed setting means 31E uses, to a map data that correlates the rate of change of the engine rotational speed with the operation speed of the pump swash plate 16A, based on detected information from the sub-gear change sensor 45, such that the lower the gear ratio of the gear type speed change device 11 is, the quicker the actuation of the pump swash plate 16A becomes, and such that the operation speed of the pump swash plate 16A becomes greater for a rate of change of the engine rotational speed with lowering of the gear ratio of the gear type speed change device 11.

That is, a suitable load control is chosen based on the map data in consideration of the set rotating speed of the engine 1. Therefore, irrespective of the set rotating speed of an engine 1, the engine stall due to overload can be effectively prevented.

Depending on the gear ratio of the gear type speed change device 11 which is shifted to a low speed side when performing an operation with a larger load, the map data is set such that the lower the gear ratio is, the greater the operation speed of the pump swash plate 16A for a given rate of change of the engine rotational speed. Therefore, deceleration operation of the pump swash plate 16A can be promptly performed in response to a rapid reduction in engine rotational speed during an operation with a large load. As a result, the engine stall due to overload can be reliably prevented.

While not shown, a manually operated operation speed setting device (operation speed setting means) is provided and has a potentiometer or a switch for setting the target operation speed of the pump swash plate 16A during a load control etc. The automatic pump swash plate control means 31D may be set up such that it controls actuation of the proportional valve 36 for forward travel, or the proportional valve 37 for reverse travel such that the pump swash plate 16A is operated at the target operation speed set by this operation speed setting device in consideration of the operation load which changes depending on the kind of the attached implement.

An operating tool for a data change command (commanding means) which has a potentiometer, a switch, etc., may be provided to the data change means 31C in the operator's station 8, for commanding a change of the map data which the automatic pump swash plate control means 31D or the second operation speed setting means 31E uses. This allows the map data to be changed depending on the attached implement.

This tractor is equipped with a switching mechanism 54 which switches the swash plate (a motor swash plate) 17A of the variable capacity motor 17 between high and low positions.

The switching mechanism 54 has a hydraulic cylinder 55 which operates the motor swash plate 17A, a changeover valve 56 which controls flow of the hydraulic fluid to this cylinder 55, an electromagnetic control valve 57 which operates this changeover valve 56, a high pressure selection valve 58 which enables feeding of the hydraulic fluid from the closed circuit 20 of the hydrostatic type continuously variable speed change device 10 to this control valve 57, a switching lever 59 arranged at the lower left position with respect to the steering wheel 6, a lever sensor 60 which has a switch which detects the actuation position of this switching lever 59, and motor swash-plate control means 31F which the control device 31 has as a control program which performs high-to-low switch actuation of the motor swash plate 17A based on detected information from this lever sensor 60.

The cylinder 55 for motor and the variable capacity motor 17 are removably housed within the second casing part 4B of the transmission case 4.

When the switching lever 59 is operated to a low-speed position based on detected information from a lever sensor 60, the motor swash-plate control means 31F performs high-to-low switching control which switches the motor swash plate 17A from the high-speed position to the low-speed position, and turns on the corresponding indicating lamp 61. And, when the switching lever 59 is operated in a high-speed position, it performs low-to-high switching control which switches the motor swash plate 17A from the low-speed position to the high-speed position, and turns on the corresponding indicating lamp 62.

That is, when the vehicle speed drops substantially due to increase in load during an up hill climb or a field operation with the switching lever 59 set in the high-speed position, the driving force to the right and left front wheels 3 and the right and left rear wheels 5 can be increased by switching the switching lever 59 to a low-speed position from a high-speed position so that the vehicle can keep on climbing or continue with work operation.

The indicating lamps 61 and 62 are arranged in the console panel 63 arranged under the steering wheel 6.

Figure 10:
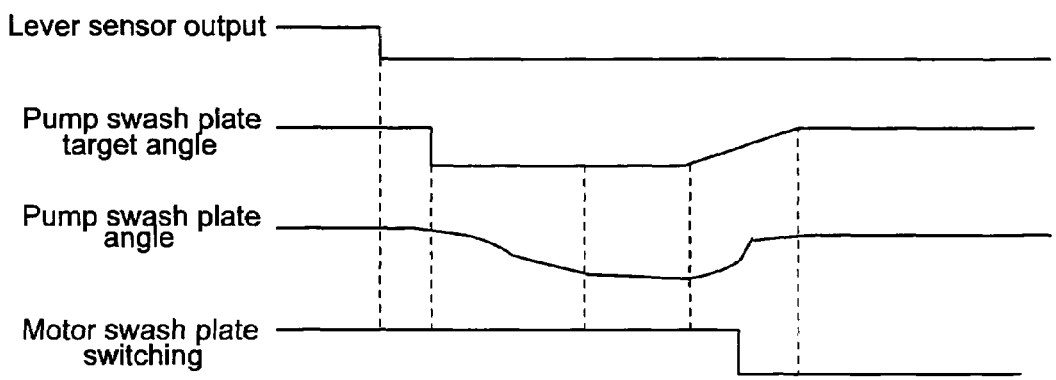
FIG. 10 is graph showing the movement of the pump swash plate when the motor swash plate position is being changed.
Figure 10:
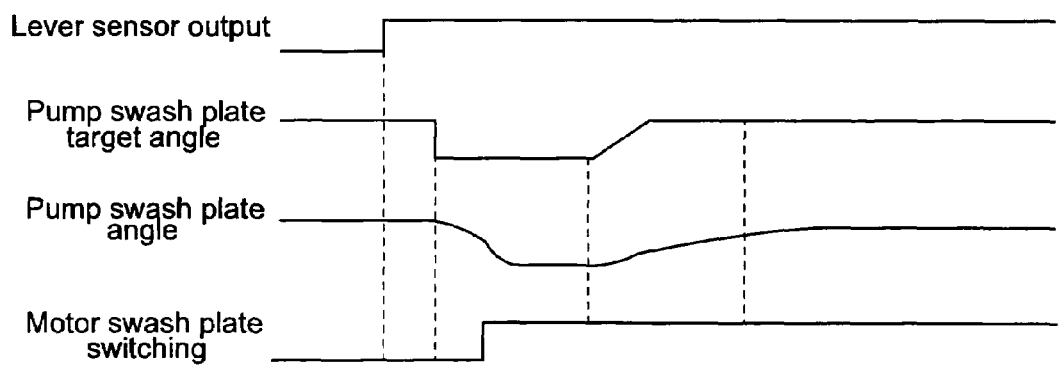
Figure 11:
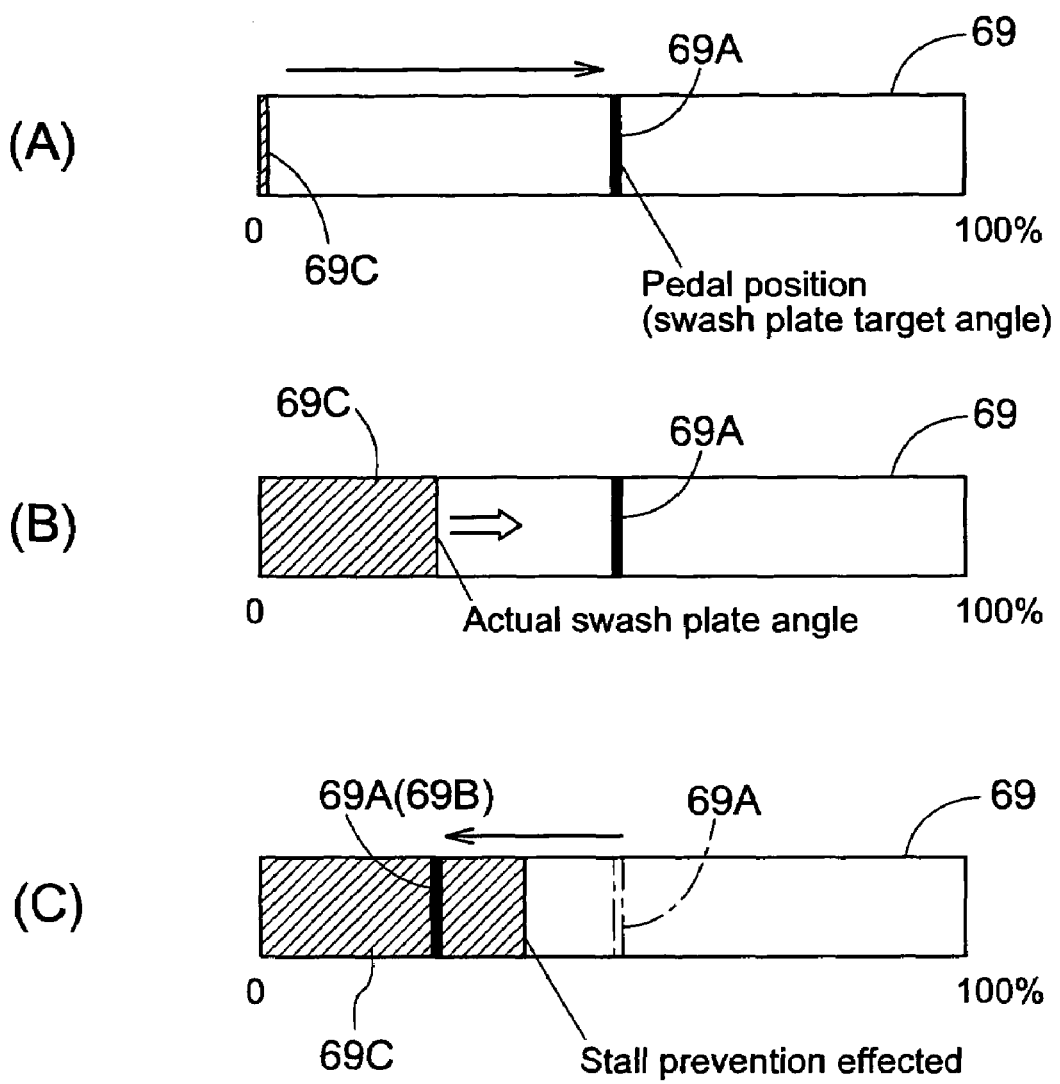
FIG. 11 shows how a pump swash plate position is displayed on a LCD.

The motor swash-plate control means 31F stores the present actuation position of the pump swash plate 16A in the high-to-low switching control based on detected information from the swash-plate sensor 30, and calculates a slowdown target actuation position of the pump swash plate 16A, and controls actuation of the proportional valve 36 for forward travel or the proportional valve 37 for reverse travel so that deceleration operation of the pump swash plate 16A is carried out at a predetermined operation speed to the computed slowdown target actuation position. The means 31F controls the actuation of the proportional valve 36 or 37 and the control valve 57 such that after the pump swash plate 16A arrives at the slowdown target actuation position, an accelerated return of the pump swash plate 16A to the stored actuation position at the predetermined operation speed and the switch over operation of the motor swash plate 17A from the high speed position to the low speed position at a predetermined speed are perfumed simultaneously (see FIG. 10(A)).

Moreover, in the low-to-high switching control, based on detected information from the swash-plate sensor 30, the present actuation position of the pump swash plate 16A is stored, and the slowdown target actuation position of the pump swash plate 16A is computed. Actuation of the proportional valve 36 for forward travel or the proportional valve 37 for reverse travel and actuation of the control valve 57 are controlled such that deceleration operation of pump swash plate 16A to the computed slowdown target actuation position at the operation speed and switch actuation from a low-speed position to the high-speed position of the motor swash plate 17A at the operation speed are performed simultaneously. Afterward, actuation of the proportional valve 36 for forward travel or the proportional valve 37 for reverse travel is controlled so that the pump swash plate 16A is returned to the memorized actuation position at the predetermined speed. [See FIG. 10(B)]

That is, when switching the motor swash plate 17A to a low-speed position from a high-speed position, by performing not only the switching actuation but also accelerating actuation of the pump swash plate 16A simultaneously, the capacity variation in the variable capacity motor 17 generated by the switching actuation to the low-speed position of the motor swash plate 17A from a high-speed position can be offset by the capacity variation in the variable capacity pump 16 generated by accelerating actuation of the pump swash plate 16A. Moreover, when switching the motor swash plate 17A to a high-speed position from a low-speed position, by performing not only the switch actuation but also a deceleration operation of the pump swash plate 16A simultaneously, the capacity variation in the variable capacity motor 17 generated by the switching actuation to the high-speed position of the motor swash plate 17A from a low-speed position can be offset by the capacity variation in the variable capacity pump 16 generated in connection with the deceleration operation of the pump swash plate 16A. Therefore, the shift shock generated by a switching actuation of the motor swash plate 17A can be alleviated.

In addition, while not shown, a high speed response valve may be used instead of the changeover valve 56. When the motor swash-plate control means 31F performs switch actuation of the motor swash plate 17A, the high speed response valve is duty-controlled such that the operation speed of the motor swash plate 17A may fall so as to slow any capacity variation in the variable capacity motor 17 generated when switching the motor swash plate 17A, which alleviates the shift shock resulting from the capacity variation in the variable capacity motor 17.

When traveling with the motor swash plate 17A switched to the high-speed position, the motor swash-plate control means 31F may perform the high-to-low switching control in conjunction with braking actuation of a braking system based on detected information from the brake sensor 49 so as to improve braking operation.

Also, the motor swash-plate control means 31F may be configured such that it performs the high-to-low switching control when traveling with the motor swash plate 17A switched to the high-speed position based on detected information from the pedal sensor 29, and detected information from the swash-plate sensor 30, irrespective of the deceleration operation of the speed change pedal 24, when it is detected that deceleration operation of the pump swash plate 16A with the forward travel decelerating spring 32 or the reverse travel decelerating spring 33 is not performed so that the high-to-low switching control can perform a deceleration operation if deceleration operation of the pump swash plate 16A is not carried out due to inertia during a trailer operation etc., despite the decelerating operation of the speed change pedal 24.

Furthermore, the motor swash-plate control means 31F may be configured so that it performs the high-to-low switching control based on detected information from the operation speed detection means 46, when the motor swash plate 17A is switched to the high-speed position, and when the operation speed of the speed change pedal 24 is greater than a predetermined operation speed so as to prevent an unexpected start and sudden acceleration.

As shown in FIG. 1, the switching lever 59 is installed such that the operable end is located near the left part of the steering wheel 6. This allows a high-to-low switch operation of the motor swash plate 17A without lifting a hand off the steering wheel 6. Moreover, when the front loader A (refer to FIG. 6) is connected to the tractor, the high-to-low switch actuation of the motor swash plate 17A can be performed without lifting the hand from the control lever for front loader actuation (not shown) arranged on the right-hand side of a steering wheel 6.

As shown in FIGS. 4-6, the control device 31 has an automatic motor swash-plate control means 31G as a control program. Automatic motor swash-plate control means 31G performs automatic high-to-low switching control which switches the motor swash plate 17A to the low-speed position from the high-speed position, and turns on the corresponding indicating lamp 61 when it is detected based on detected information from the pedal sensor 29 that the actuation position of the speed change pedal 24 is operated to the predetermined actuation position or the operation area, when the engine rotational speed is detected to have fallen to the low-to-high switch engine speed near a predetermined maximum torque output rotational frequency, or the low-to-high switch engine-speed region set for a given actuation position of the speed change pedal 24 based on the maximum torque output characteristic of an engine 1, and the engine drop amount computed by the operation program of the automatic pump swash plate control means 31D. The automatic motor swash-plate control means 31G also performs the automatic low-to-high switching control which switches the motor swash plate 17A to a high-speed position from a low-speed position, and turns on the corresponding indicating lamp 62, when it is detected based on an engine drop amount that the engine rotational speed went up to the low-to-high switch engine speed near a predetermined set rotating speed or the low-to-high switch engine-speed region, and when actuation of the speed change pedal 24 to the actuation position or operation area set up beforehand is detected based on detected information from the pedal sensor 29.

More specifically, if the actuation position of the pedal 24, whose maximum treading-in position is 100%, is 50% or less, for example, automatic high-to-low switching control is performed when the engine rotational speed falls to 85% of the engine speed. If the actuation position of the pedal 24 is 90% or greater, the automatic high-to-low switching control is performed when the engine rotational speed falls to 70% or less. When the engine rotational speed goes up to 90% or greater, automatic low-to-high switching control is performed when the actuation position of a pedal 24 is operated to be 80% or greater.

That is, a large load condition is naturally assumed when the engine drop amount is large when the speed change pedal 24 is operated by a greater amount. But also if a certain amount of engine drop occurs when the amount of the step-in operation of the speed change pedal 24 is small, a large load condition is assumed where a greater drop in engine rotation is expected with a large step-in operation of the pedal 24. Therefore, even if an engine drop amount is small, the high-to-low switching control is performed to secure sufficient driving force. Therefore, even if the operator does not perform shift operation taking into consideration an operation load etc., heavy-load operation which requires a large driving force may be continued without an engine stall. Just when the operator tends to want to accelerate further as the load falls and the engine rotational speed goes up to near predetermined set rotating speed, low-to-high switching control is performed and the vehicle speed is raised. This avoids the inconvenience that low-to-high switching control is performed resulting in an unexpected acceleration despite the operator decreasing the amount of step-in operation on the speed change pedal 24 to slow down with a decrease in the load.

In the high-to-low switching control of the automatic motor swash-plate control means 31G, when the switch actuation is performed, the vehicle speed is low due to traveling load and a shift shock is assumed to be small. Therefore, control for alleviating a shift shock as in the high-to-low switching control in the motor swash-plate control means 31F is not performed. Actuation of the proportional valve 36 for forward travel or the proportional valve 37 for reverse travel is controlled so that switch actuation of the motor swash plate 17A is carried out from a high-speed position to a low-speed position at the predetermined operation speed. After switching the motor swash plate 17A to a low-speed position, that state is maintained for a predetermined time period (for example, for 2 seconds).

Also, in the low-to-high switching control of the automatic motor swash-plate control means 31G, the same control actuation as in the low-to-high switching control in the motor swash-plate control means 31F is performed, and the shift shock generated by low-to-high switch actuation of the motor swash plate 17A is alleviated. After switching the motor swash plate 17A to a high-speed position, this state is maintained for a predetermined time period (for example, for 2 seconds).

It is also possible to configure the automatic motor swash-plate control means 31G such that it performs the automatic high-to-low switching control which switches the motor swash plate 17A from the high-speed position to the low-speed position and turns on the corresponding indicating lamp 61, as the engine rotational speed is detected to have fallen to the low-to-high switch engine speed near a predetermined maximum torque output rotational speed, or to the low-to-high switch engine-speed region, based on the maximum torque output characteristics of the engine 1, and the engine drop amount computed by the operation program of the automatic pump swash plate control means 31D and such that it performs an automatic low-to-high switching control which switches the motor swash plate 17A from the low-speed position to a high-speed position, as the engine rotational speed is detected to have gone up to the low-to-high switch engine speed near predetermined set rotating speed, or to the low-to-high switch engine-speed region, based on an engine drop amount, and turns on the corresponding indicating lamp 62.

The control device 31 has mode change-over means 31H as a control program which switches the control mode performed based on actuation of the mode setting device 64 which has a normally open switch on the display panel 63. When an ON signal is inputted in connection with the pressing of the mode setting device 64, the mode change-over means 31H switches the transmission control mode between a manual-control mode, a semi-automatic-control mode, or a automatic-control mode and turns on an indicating lamps 65-67 corresponding to each control mode. In the manual-control mode, it performs the speed control using control actuation of the pump swash plate control means 31A and switching control using control actuation of the motor swash-plate control means 31F. In the semi-automatic-control mode, it performs the speed control which uses control actuation of the pump swash plate control means 31A, and a load control using control actuation of the automatic pump swash plate control means 31D, and a switching control using control actuation of the motor swash-plate control means 31F, such that priority may be given to load control as opposed to the speed control. In the automatic-control mode, the mode change-over means 31H performs a speed control which uses control actuation of the pump swash plate control means 31A, and a load control using control actuation of the automatic pump swash plate control means 31D, and the automatic switching control using control actuation of the automatic motor swash-plate control means 31G, such that priority is given to load control as opposed to speed control, and such that load control and automatic switching control are coordinated appropriately.

That is, when manual-control mode is selected, the pump swash plate 16A is operated based on the actuation position of the speed change pedal 24 etc., so as to arrive at the target actuation position corresponding to the actuation position of the speed change pedal 24 with target operation speed. And the motor swash plate 17A will be switched between the high and low positions based on actuation of the switching lever 59.

The pump swash plate 16A is operated based on the actuation position of the speed change pedal 24 etc., so as to arrive at the target actuation position corresponding to the actuation position of the speed change pedal 24 with target operation speed. And when a drop in engine speed occurs, based on an engine drop amount etc., it is operated so as to arrive at the limit operation position corresponding to an engine drop amount at the target operation speed, and the motor swash plate 17A is switched between the high and low positions based on actuation of the switching lever 59.

When automatic-control mode is selected, the pump swash plate 16A is operated so as to arrive at the target actuation position corresponding to the actuation position of the speed change pedal 24 at the target operation speed. When engine speed drops, the pump swash plate 16A is operated so as to arrive at the limit operation position corresponding to an engine drop amount at target operation speed, based on an engine drop amount etc. And the motor swash plate 17A is switched between the high and low positions at a suitable timing based on the actuation position of the speed change pedal 24, or the engine drop amount, etc.

Therefore, if the manual-control mode is selected for example, for traveling and a light load operation, or if the semi-automatic-control mode is selected when climbing a relatively steep hill, and for a medium-load operation, or if the automatic-control mode is selected when climbing a very steep hill, or for a heavy-loading operation, such traveling and operation can be performed without increased burden to the operator.

Incidentally, in the load control in the automatic-control mode, the lower limit engine speed of an engine 1 is set lower than the load control in the semi-automatic-control mode so that control sensibility is set low which tends to cause drops in engine speeds. Therefore, the automatic switching control which switches the motor swash plate 17A to a low-speed position can be easily performed.

Moreover, when switch actuation to the low-speed position of the motor swash plate 17A based on actuation of the switching lever 59 is performed in the automatic-control mode, since it is impossible to perform switch actuation to the low-speed position of the motor swash plate 17A by automatic switching control, control mode switches from automatic-control mode to semi-automatic-control mode automatically.

As shown in FIG. 6, the console panel 63 has the liquid-crystal-display device 69 where the display may be changed among a vehicle speed displaying mode, or a remaining fuel displaying mode, etc. based on actuation of the display change-over switch 68. This liquid-crystal-display device 69 displays the target actuation position 69A or the limit operation position 69B, and the current position 69C of the pump swash plate 16A which changes at every moment, when the pump swash plate position display mode is selected by actuation of the display change-over switch 68. That is, by selecting pump swash plate position display mode, the motion of the pump swash plate 16A can be checked easily.

Incidentally, FIG. 6(A) shows the situation where the target actuation position 69A for accelerating for the pump swash plate 16A is set. FIG. 6(B) shows the situation where the pump swash plate 16A is operated toward the target actuation position 69A for accelerating. FIG. 6(C) shows the situation where the target actuation position 69A or the limit operation position 69B for a slowdown of the pump swash plate 16A is set.

When an implement, such as a front loader A, is vertically movably attached with the height sensor 70 having a potentiometer which detects the height position of the implement, the data change means 31C changes the map, which correlates the actuation position of the speed change pedal 24 with the actuation position of the pump swash plate 16A which the pump swash plate control means 31A uses, to the map data for implement lifting stored in the pump swash plate control means 31A based on detected information from the height sensor 70, as the implement is raised to the height position higher than predetermined height (for example, height position exceeding a car height).

As compared with the map data ordinarily used, the map data for implement lifting sets the actuation position of the pump swash plate 16A for a given actuation position of the speed change pedal 24 to a lower speed side. (See FIG. 7). Because the pump swash plate control means 31A uses this map data, the vehicle speed will be restricted to the low speed side and a high speed travel will be prevented when the implement is raised higher than a set height.

As shown in FIGS. 4 and 5, the servo control mechanism 25 has a servo valve 27, a regulator valve 28, and the swash-plate sensor 30, and the oil temperature sensor 43 which are housed by the casing 71 removably bolt-connected by the right side part of the second casing part 4B in a transmission case 4 and is formed as a unit electronically operated mechanism 72. This electronically operated mechanism 72 may be easily changed to a mechanical type by replacing it with a mechanical unit 76 of one block type by incorporating the operating shaft 73 operatively connected to the speed change pedal 24 through the linkage mechanism (not shown) of a mechanism type as shown in FIGS. 12 and 13, and the servo valve 74 which has a spool which controls flow of the hydraulic fluid to the cylinder 26 for pumps in the casing 75 which is bolt-connected to the right side part of the second casing part 4B in a transmission case 4.

Figure 12:
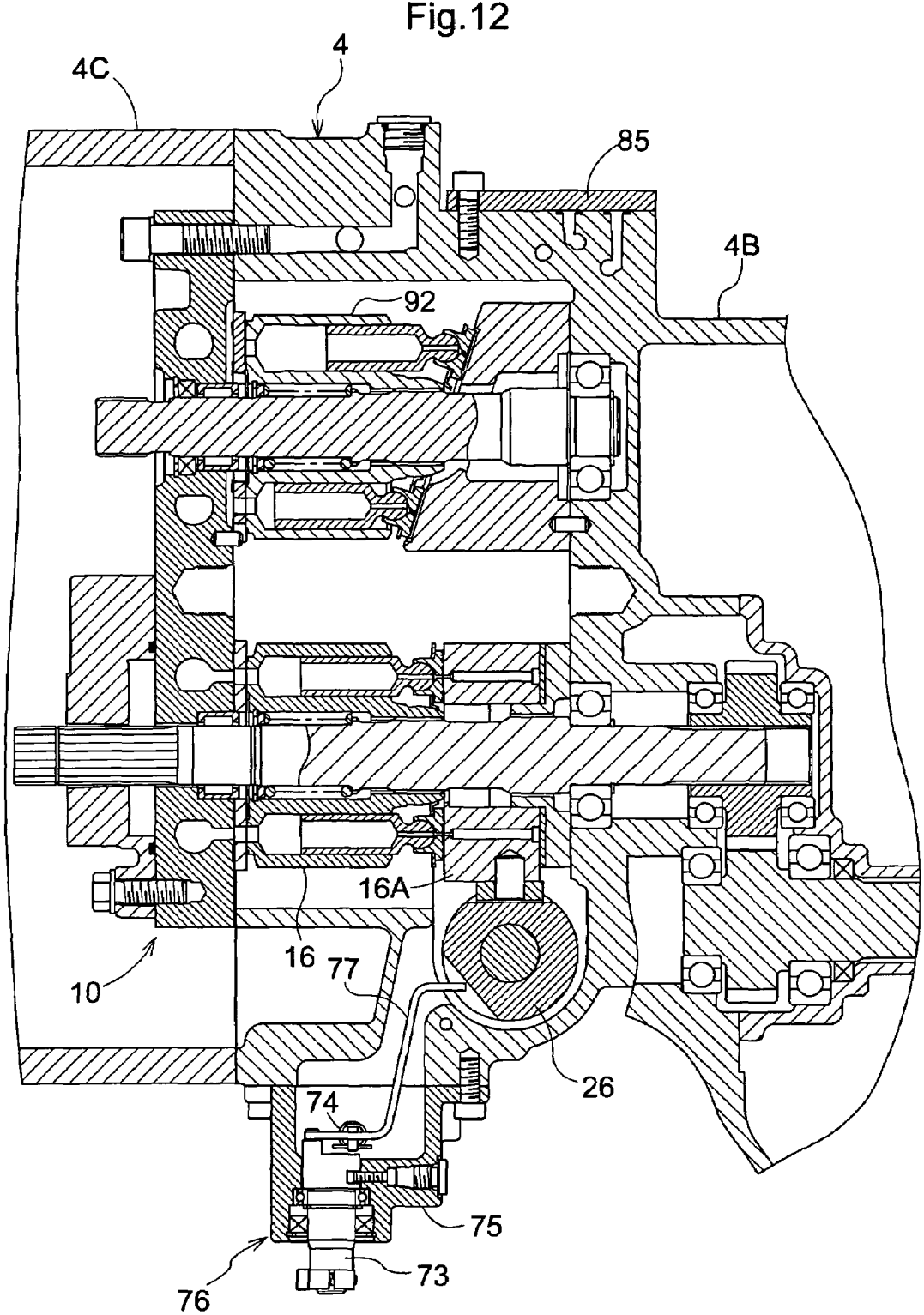
FIG. 12 is a sectional plan view showing a mechanical servo control mechanism.

In addition, the element numbered 77, shown in FIGS. 4 and 12, is a link arm used in the electronics type servo control mechanism 25 as a feedback arm provided between the cylinder 26 for pumps, and the swash-plate sensor 30, and used, in the mechanical servo control mechanism 78, as an actuation/feedback combination arm provided between the cylinder 26 for pumps, and the operating shaft 73 to actuate the servo valve 74.

Figure 13:
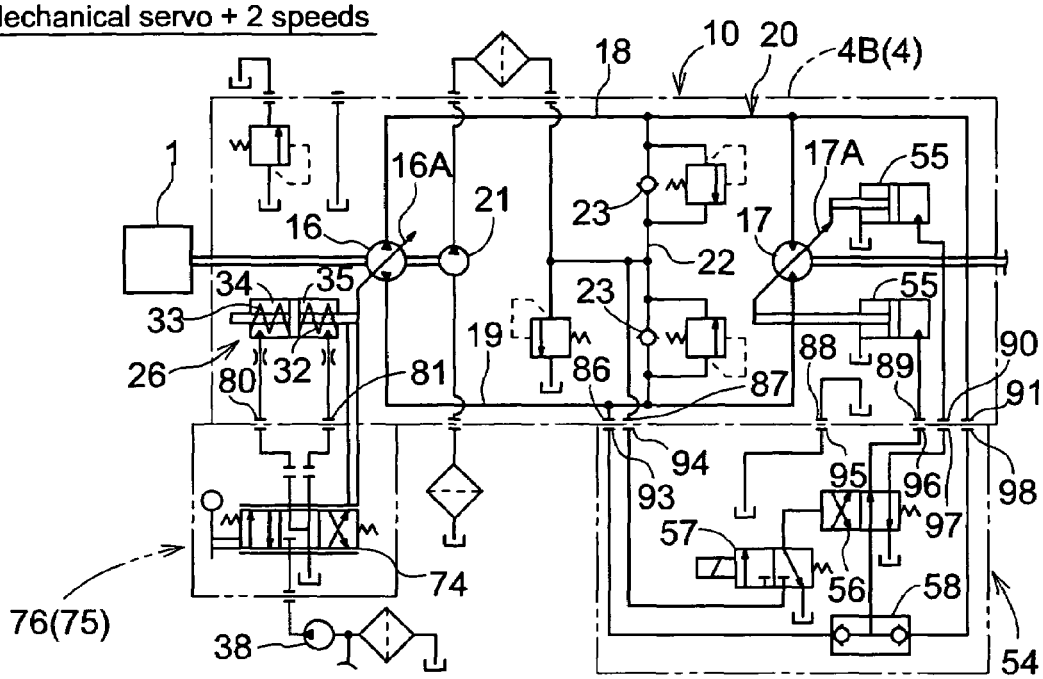
FIG. 13 is a hydraulic circuit diagram showing the mechanical servo control mechanism and the switch over mechanism.

Moreover, the elements numbered 78 and 79 shown in FIGS. 5 and 13 are connecting openings formed in the abutting surface against the second casing part 4B of the casing 71 for connecting to the connecting openings 80 and 81 when the electronics type operated mechanism 72 is bolt-connected to the right side part of the second casing part 4B.

Figure 14:
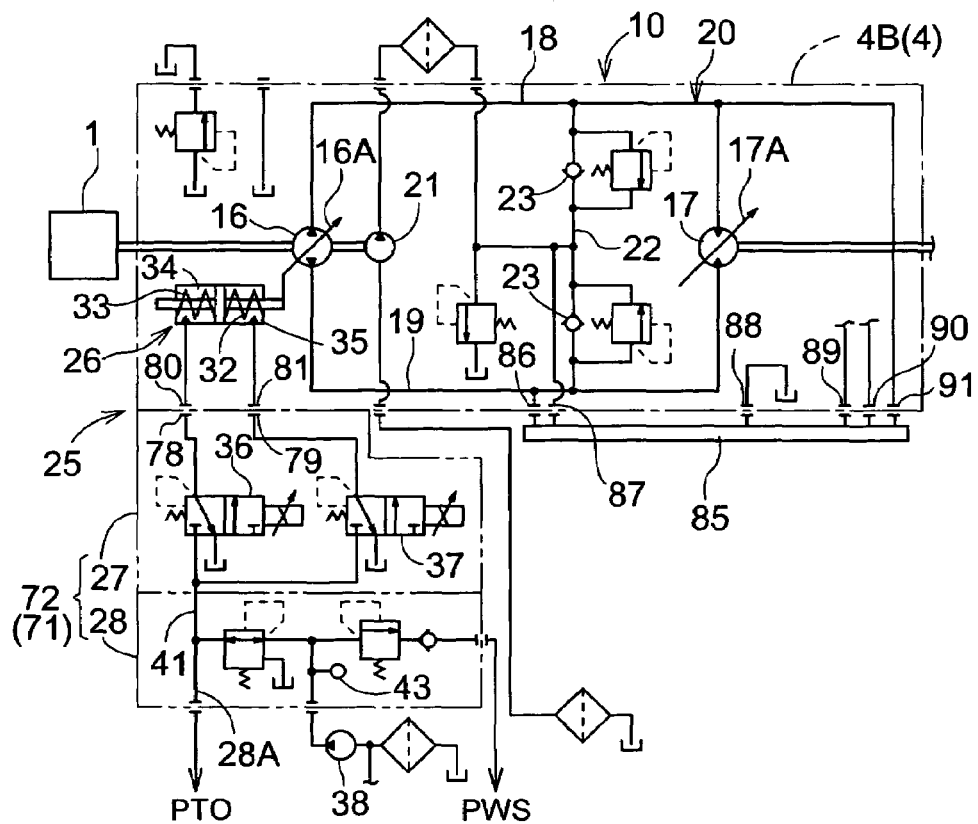
FIG. 14 is a hydraulic circuit diagram showing an arrangement where only an electronic servo control mechanism is used.

As shown in FIGS. 4 and 5, the switching mechanism 54 with the changeover valve 56, the control valve 57, and the high pressure selection valve 58 is formed as a one block unit of the control mechanism 84 by virtue of being housed by the casing 83 removably bolt-connected to the left side part of the second casing part 4B of the transmission case 4. The device can be changed from an adjustable motor specification to a fixed motor specification relatively simply by replacing the operating mechanism 84 with a plate 85 as shown in FIGS. 12 and 14 to cover connecting holes 86-91 formed in the surface with the operating mechanism 84 of the second casing part 4B and by replacing the variable capacity motor 17 in the second casing part 4B with the fixed capacity motor 92, and by removing the cylinder 55 for the motor.

In addition, the elements with reference numbers 93-98 shown in FIG. 5 are communicating ports formed in the bonded surface with the second casing part 4B of casing 83 that are connected to each corresponding communicating ports 86-91 of the second casing part 4B when the switching mechanism 54 is bolt-connected to the left side part of the second casing part 4B.

Figure 15:
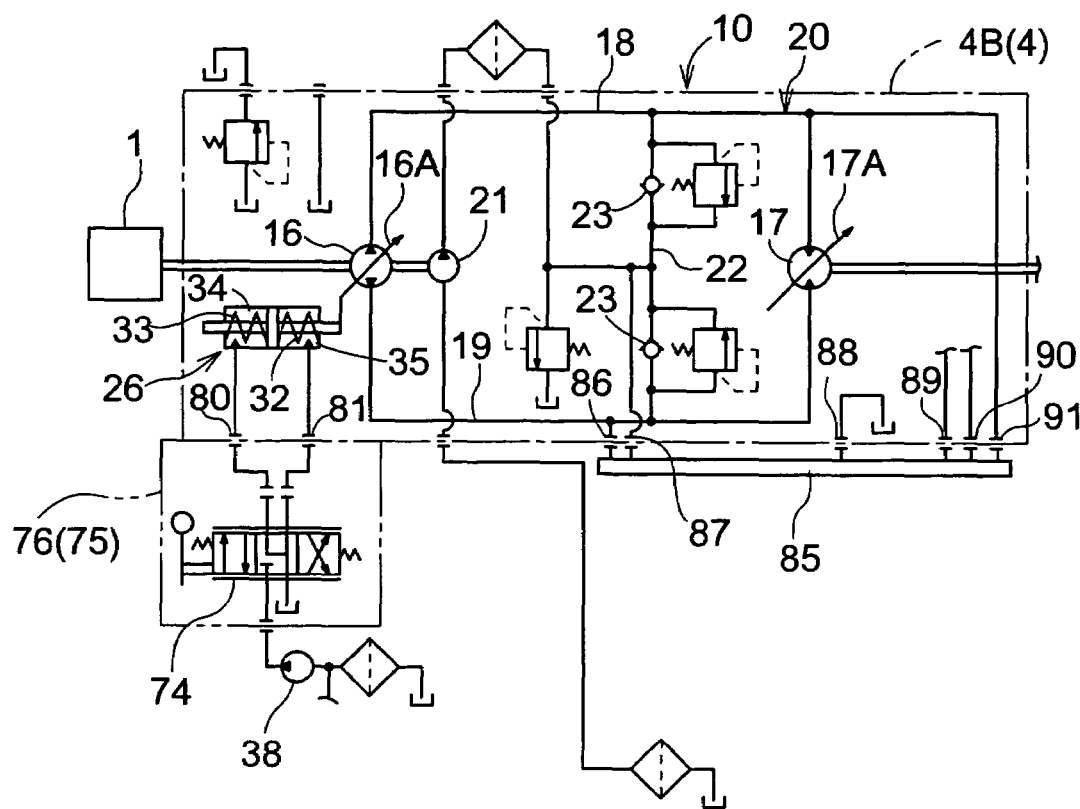
FIG. 15 is a hydraulic circuit diagram showing an arrangement where only a mechanical servo control mechanism is used.

Because of the above-mentioned structure, the arrangement can simply be changed among one having the adjustable motor and the servo control mechanism 25 of the electronic type (see FIG. 5), one with an adjustable motor and the servo control mechanism 78 of the mechanical type (see FIG. 13), one with a fixed motor specification and the electronic servo control mechanism 25 (see FIG. 14), and one with a fixed motor and the servo control mechanism 78 of the mechanical type (see FIG. 15) which allows cost reduction because parts may be shared and facilitates parts management.

As shown in FIG. 6, the end regions of the operation area of the speed change pedal 24 may be set as high-speed regions, and a region between the two ends as a low-speed region, and the motor swash-plate control means 31F may be arranged to control actuation of the control valve 57 based on detected information from the pedal sensor 29 such that when the speed change pedal 24 is operated to a low-speed region, the motor swash plate 17A switches to a low-speed position, and when the speed change pedal 24 is operated to a high-speed region, the motor swash plate 17A is located in a high-speed position to use the speed change pedal 24 also as an operating element for a high-low 2 position change-over of the variable capacity motor 17. The end regions of the operation area of the speed change pedal 24 may be set as a high-speed region, and the motor swash-plate control means 31F may be arranged to control actuation of the control valve 57 based on detected information from the pedal sensor 29 such that when the speed change pedal 24 is operated to a high-speed region, the motor swash plate 17A is switched to a high-speed position to use the speed change pedal 24 also as an operating element for a low-to-high switch of the variable capacity motor 17.

Thus, when the speed change pedal 24 is used also as an operating element for switching the variable capacity motor 17, a detent mechanism (not shown) may be provided for indicating the boundary of the operation area of the speed change pedal 24.

Another embodiment of a present invention is described next.

The same reference numbers are used for the same parts as the above-mentioned embodiment, and descriptions of the same parts are not repeated.

A cruise speed control (a constant speed control) is described next.

As shown in FIGS. 1 and 17, the operator's station 8 has the cruise speed lever (cruise speed operating tool) 143 only for the forward travel speed change which can be held at an arbitrary shift position by a friction type holding mechanism (not shown). As shown in FIG. 17, the position of the cruise speed lever 143 is detected by the lever sensor (an example of a holding position detection means) 144 which has a potentiometer. A lever sensor 144 outputs the holding position of the detected cruise speed lever 143 to the control device 31. As shown in FIG. 17, the control means 31 has cruise speed control means 31P for changing speed in accordance with the actuation position of the cruise speed lever 143.

As shown in FIGS. 17 and 19, the cruise speed control means 31P has a map data which correlates the holding position of the cruise speed lever 143 with the shift operation position of the pump swash plate 16A, and a control program which controls actuation of the proportional valve 36 for forward travel based on the map data and detected information from a lever sensor 144 etc. The map data of the cruise speed control means 31P correlates the actuation position of the cruise speed lever 143 with the shift operation position of the pump swash plate 16A (refer to FIG. 19) such that the greater the operated amount of the cruise speed lever 143 from the neutral position (zero speed position) in the forward speed increase direction is, the greater the operation amount of the pump swash plate 16A from the neutral position in the direction of forward travel is.

The above-mentioned map data may be replaced with a correlation equation that correlates the actuation position of the cruise speed lever 14 with the shift operation position of the pump swash plate 16A. The control program of the cruise speed control means 31P sets the shift operation position of the pump swash plate 16A corresponding to the holding position of the cruise speed lever 143 which the lever sensor 144 detected as the target actuation position of the pump swash plate 16A based on the stored map data and detected information from a lever sensor 144, and controls the actuation of the proportional valve 36 for forward travel based on the set target actuation position and detected information from the swash-plate sensor 30, so that the target actuation position of the pump swash plate 16A come into agreement with the actual shift operation position.

This allows a control where the vehicle's forward speed is set according to the holding position of the cruise speed lever 143 simply by operating the cruise speed lever 143 to a desired position against the comparatively small holding force that holds the cruise speed lever 143 in arbitrary actuation positions.

As shown in FIG. 17, the control means 31 has a third operation speed setting means 31J for setting the operation speed during a speed change to the speed according to the holding position of the cruise speed lever 143. As shown in FIGS. 17 and 18, the third operation speed setting means 31J has an operation program which computes the deviation of the target actuation position of the pump swash plate 16A, and a actual shift operation position based on the target actuation position of the pump swash plate 16A set by the cruise speed control means 31P, and detected information from the swash-plate sensor 30, a plurality of map data as correlation data which correlates the deviation of the target actuation position of the pump swash plate 16A and the actual shift operation position with the operation speed of the pump swash plate 16A, and a control program which sets the target operation speed of the pump swash plate 16A based on those map data and calculation results of an operation program.

Each map data of the third operation speed setting means 31J correlates the deviation of the pump swash plate 16A with the operation speed of the pump swash plate 16A such that when the deviation of the actual shift operation position of the pump swash plate 16A detected by the swash-plate sensor 30 and the target actuation position of the pump swash plate 16A set by the cruise speed control means 31P is large, the operation speed of the pump swash plate 16A is large, and such that the operation speed of the pump swash plate 16A by control actuation of the cruise speed control means 31P becomes slower than the operation speed of the pump swash plate 16A by control actuation of the speed change control means 31A (dashed line in FIG. 18).

The above-mentioned map data may be replaced by the correlation equation as correlation data that correlates the deviation of the target actuation position of the pump swash plate 16A and the actual shift operation position, with the operation speed of the pump swash plate 16A.

The control program of the third operation speed setting means 31J sets the operation speed of the pump swash plate 16A corresponding to the deviation of the computed pump swash plate 16A as the target operation speed of the pump swash plate 16A, based on the stored map data and the calculation result of an operation program, and outputs the set target operation speed to the cruise speed control means 31P.

The control program of the cruise speed control means 31P is arranged to control actuation of the proportional valve 36 for forward travel so that the pump swash plate 16A is operated at the target operation speed set by the third operation speed setting means 31J. With this control, the operation speed during shift operation of the pump swash plate 16A by actuation of the cruise speed lever 143 becomes slower than the operation speed when operating the pump swash plate 16A by actuation of the speed change pedal 24. As a result, while improving response in shift operation by the speed change pedal 24, rapid change in the vehicle speed by actuation of the cruise speed lever 143 can be prevented thus making cruise speed setting operation by the cruise speed lever 143 easy to perform.

The data change means 31C changes the map data which the third operation speed setting means 31J uses, based on the actuation position of the adjustment dial plate 42, into the map data that correlates the deviation of the pump swash plate 16A with the operation speed of the pump swash plate 16A so that the greater the operation amount of the adjustment dial 42 to the quick side from a reference position is, the speedier shift operation of the pump swash plate 16A becomes so that the operation speed of the pump swash plate 16A for a given deviation of the pump swash plate 16A becomes large. And it changes the map data to one that correlates the deviation of the pump swash plate 16A with the operation speed of the pump swash plate 16A so that the greater the operation amount of the adjustment dial 42 is toward the slow side from a reference position, the slower the shift operation of the pump swash plate 16A becomes, and so that the operation speed of the pump swash plate 16A for a given deviation of the pump swash plate 16A becomes slower.

That is, by operating the adjustment dial 42, the actuation feeling of a shifting operation of the hydrostatic equation continuously variable speed change device 10 with the cruise speed lever 143 can be changed according to the liking of an operator as well as the actuation feeling of shift operation of the hydrostatic equation continuously variable speed change device 10 by the speed change pedal 24, thus improving the actuation feeling or shift operation response.

FIG. 23 shows a curve for the angular position of the pump swash plate 16A with respect to time when the adjustment dial 142 is set to the quick side, and a curve for the angular position of the pump swash plate 16A with respect to time during cruise speed control and, a curve showing the angular position of the pump swash plate 16A with respect to time when the adjustment dial 142 set to the slow side.

As shown in FIG. 17, the control device 31 has, as control programs, actuation change-over means 31K which switches the control means to operate, notifying device change-over means 31G which switches the operating state of the notifying device 145 which has a lamp in the operator's station 8, and cruise speed control stop means 31M to stop control actuation of the cruise speed control means 31P.

The notifying device 145 may be a liquid-crystal-display device, a buzzer, etc.

The actuation change-over means 31K is configured to perform the following control. It compare the target actuation position (shift operation position of the pump swash plate 16A corresponding to the actuation position of the speed change pedal 24) of the pump swash plate 16A set by control of the speed change control means 31A with he target actuation position (shift operation position of the pump swash plate 16A corresponding to the holding position of the cruise speed lever 143) of the pump swash plate 16A set by control actuation of the cruise speed control means 31P.

The control means is changed based on the comparison so that the control means (between speed change control means 31A and the cruise speed control means 31P) for which the speed corresponding to the target actuation position is greater is selected to operate.

The notifying device change-over means 31L performs the following control. The notifying device 145 is switched off based on detected information from the pedal sensor 29, or detected information from a lever sensor 144, etc., when the cruise speed lever 143 is detected to be located in the neutral position, and when a step in operation of the speed change pedal 24 is detected with the cruise speed lever 143 being detected to be located in the neutral position. The notifying device 145 is turned on based on detected information from the pedal sensor 29, detected information from a lever sensor 144, etc., when the shift operation position of the pump swash plate 16A corresponding to the holding position of the cruise speed lever 143 is detected to be on the acceleration side than the shift operation position of the pump swash plate 16A corresponding to the actuation position of the speed change pedal 24. The notifying device 145 is made to blink (turned on and off in succession), based on detected information from the pedal sensor 29, detected information from a lever sensor 144, etc., while the cruise speed lever 143 is detected to be located in the actuation position away from the neutral position, and the shift operation position of the pump swash plate 16A corresponding to the actuation position of the speed change pedal 24 is detected to be at the shift operation position of the pump swash plate 16A corresponding to the holding position of the cruise speed lever 143 or on the accelerating side with respect to the shift operation position.

The cruise speed control stop means 31M is configured to perform the following control. When the step in operation to the reverse travel speed change region of the speed change pedal 24 is detected based on detected information from the pedal sensor 29 during the cruise speed forward operation under control of the cruise speed control means 31P, or when both of the pair of side brake pedals 147 in the operator's station 8 are detected to be operated on based on detected information from the brake sensor 146, actuation of the proportional valve 36 for forward travel is controlled so that the pump swash plate 16A is operated toward the neutral position at the operation speed for a predetermined cruise speed control stop.

At this point in time, unless the actuation to the neutral position of the cruise speed lever 143 is detected based on detected information from a lever sensor 144, control actuation of the cruise speed control means 31P is stopped.

Moreover, when it is detected based on detected information from a lever sensor 144 at the time of start up of an engine 1 that the cruise speed lever 143 is not located in the neutral position, or when accelerating actuation of the cruise speed lever 143 is detected based on detected information from a lever sensor 144 when traveling in reverse, control actuation of the cruise speed control means 31P is stopped until it detects the actuation of the cruise speed lever 143 to the neutral position. If the speed change pedal 24 is operated forwardly in the forward travel direction while the cruise speed lever 143 is located in the neutral position, the pump swash plate 16A is operated to a position to a forward travel accelerating side corresponding to the actuation position of the speed change pedal 24, and the vehicle body moves forward at the speed in accordance with the shift operation position. When this happens, the notifying device 145 is turned off to notify that the system is in the normal traveling condition where shift operation only by the speed change control means 31A is performed.

If the speed change pedal 24 is operated to the reverse travel side while the cruise speed lever 143 is located in the neutral position, the pump swash plate 16A is operated to the shift operation position to the side of reverse travel corresponding to the actuation position of the speed change pedal 24, and the vehicle body travels in reverse at the speed dictated by the shift operation position.

The notifying device 145 is turned off also in this case to notify that the system is in the normal traveling condition. If a pivoting operation is pivoted in the accelerating direction of the cruise speed lever 143 with the speed change pedal 24 located in the neutral position, the pump swash plate 16A will be shifted to the shift operation position to the forward accelerating travel side corresponding to the holding position of the cruise speed lever 143, and a vehicle body will carry out a cruise speed forward travel at the speed set by the shift operation position. In this case, the notifying device 145 is turned on to notify that the system is in the cruise speed forward condition under control of the cruise speed control means 31P.

If the cruise speed lever 143 is pivoted to the accelerating direction during a forward travel by actuation of the speed change pedal 24, the vehicle body moves forward at a speed corresponding to the actuation position of the speed change pedal 24 until the target actuation position (target actuation position of the cruise speed control means 31P) of the pump swash plate 16A set by control of the cruise speed control means 31P is on the accelerating side with respect to the target actuation position (target actuation position in the speed change control means 31A) of the pump swash plate 16A set by control of the speed change control means 31A. During this time, the notifying device 145 goes out to notify that the system is in a normal traveling condition. At this point in time, if the target actuation position in the cruise speed control means 31P is on an accelerating side rather than the target actuation position in the speed change control means 31A by a pivoting operation -to the accelerating direction of the cruise speed lever 143, or the deceleration operation of the speed change pedal 24, the vehicle body moves forward at the speed according to the actuation position of the cruise speed lever 143, resulting in the cruise speed travel according to the holding position of the cruise speed lever 143.

In this case, the notifying device 145 is turned on to notify that the system is in the cruise speed forward condition.

If the speed change pedal 24 is operated to the forward accelerating travel direction during the cruise speed forward condition based on actuation of the cruise speed lever 143, the vehicle carries out cruise speed traveling at the speed according to the holding position of the cruise speed lever 143 until the target actuation position set by the speed change control means 31A is the same as the target actuation position set by the cruise speed control means 31P, or is on an accelerating side with respect to the target actuation position set by the cruise speed control means 31P.

During this time, the notifying device 145 is turned on to notify that the system is in the cruise speed forward condition. At this time, the vehicle moves forward at the speed according to the actuation position of the speed change pedal 24 if the target actuation position set by the speed change control means 31A becomes the same as the target actuation position set by the cruise speed control means 31P, or is on an accelerating side with respect to the target actuation position set by the cruise speed control means 31P by a operation of the speed change pedal 24 to the direction of forward accelerating travel.

In this case, the notifying device 145 blinks to notify that the system is in the accelerating precedence condition where priority is given to the shift operation by control of the speed change control means 31A in the cruise speed forward condition by control of the cruise speed control means 31H. At this time, if the target actuation position in the speed change control means 31A comes to be on a slowdown side with respect to the target actuation position in the cruise speed control means 31P by the deceleration operation of the speed change pedal 24, the vehicle will carry out cruise speed traveling at the speed according to the holding position of the cruise speed lever 143 again.

In this case, the notifying device 145 lights up to notify that the system is in the cruise speed forward condition.

If the speed change pedal 24 is operated to the direction of reverse accelerating travel or both of the side brake pedals 147 are actuated during the cruise speed forward condition based on actuation of the cruise speed lever 143, the vehicle speed is gradually slowed down toward the speed set by the actuation position of the speed change pedal 24 from the speed set by the holding position of the cruise speed lever 143, and the vehicle runs at the speed according to the actuation position of the speed change pedal 24. In this case, the notifying device 145 is turned off to notify that the system is in the normal traveling condition.

After the speed change pedal 24 is operated to the direction of reverse accelerating travel or after both of the side brake pedals 147 are actuated during the cruise speed forward condition based on actuation of the cruise speed lever 143, it becomes possible to carry out the cruise speed forward travel of the vehicle at the speed according to the actuation position of the cruise speed lever 143 by returning the cruise speed lever 143 to the neutral position.

The speed maintenance mechanism A is has the cylinder 26 for pumps, a regulator valve 28, the swash-plate sensor 30, the control device 31, the proportional valve 36 for forward travel, the cruise speed lever 143, the lever sensor 144, etc.

The above-mentioned structure enables advantageous coordination between the shift operation by the speed change pedal 24, and the shift operation by the cruise speed lever 143 while the operator is made aware of the traveling condition initiated by these operation.

A neutral return mechanism may be provided which, for example, may have an electromagnetic cylinder etc., so that the cruise speed lever 143 is automatically returned to the neutral position, when the speed change pedal 24 is operated to the direction of reverse accelerating travel or after both of the side brake pedals 147 are actuated during the cruise speed forward condition based on actuation of the cruise speed lever 143, so as to improve the shift operation further.

As shown in FIGS. 20 and 21, the brake sensor 146 has a single normally closed switch 148 and a pair of bent links 149. The bent links 149 are arranged between the coordinated arm 147A of the corresponding side brake pedal 147, and the panel frame 50 located forwardly of the side brake pedal 147 such that they can expand and contract.

The normally closed switch 148 is held in the open condition by pressing operation by both bent links 149 in the non-braking state where both side brake pedals 147 are not actuated [see FIG. 20]. During the braking turning state where one of the side brake pedals 147 is pressed down, the circuit is kept open by the pressing operation by the bent link 149 connected to the side brake pedal 147 which is not actuated [see FIG. 21(A)].

In the braking state where both side brake pedals 147 are actuated, the circuit returns to a closed state due to the fact that neither of the two bent links 149 are pressing down on the switch [see FIG. 21(B)].

That is, a simple structure having the single normally closed switch 148 for a pair of side brake pedals 147, can ensure reliable detected information from actuation of both brake pedals 147.

When shift operation of the pump swash plate 16A is performed by the electronic type servo control mechanism 25 as shown in FIG. 24, a hysteresis will occur between the actuation position of the pump swash plate 16A, and a servo pressure (operating physical force to the pump swash plate 16A). Therefore, when shift operation of the pump swash plate 16A is performed by control actuation of the speed change control means 31A based on actuation of the speed change pedal 24 without taking this hysteresis into consideration, when switching between the acceleration operation and the decelerating by the speed change pedal 24 is performed, the difference of the servo pressure at the time of the accelerating actuation to the current position of the pump swash plate 16A, and the servo pressure at the time of deceleration operation by the hysteresis causes the pump swash plate 16A to be maintained despite an actuation of the speed change pedal 24 in a current position until the difference is canceled by actuation of the servo control mechanism 25 based on actuation of the speed change pedal 24.

That is, in the shift operation after an by the speed change pedal 24, the response of the pump swash plate 16A will fall, and the operator may feel the adverse effect. To this end, as shown in FIG. 17, the control device 31 has the compensation means 31Q which compensates for the difference between the servo pressure at the time of the accelerating actuation to the current position of the pump swash plate 16A and the servo pressure at the time of deceleration operation when the acceleration or deceleration operation by the speed change pedal 24.

The compensation means 31Q has a operation program which computes the actuation position after the fixed time period of the speed change pedal 24 based on detected information from the pedal sensor 29, correlation data which correlates the servo pressure at the time of the accelerating actuation for a given actuation position of the pump swash plate 16A with the servo pressure at the time of deceleration operation, and a control program which controls actuation of a servo valve 27 based on the calculation result of the operation program and correlation data.

Based on detected information from the pedal sensor 29, the operation program of the compensation means 31Q detects the current position θ of the speed change pedal 24 and computes operation speed ω and predicts the actuation position β(=θ+ωt) of the speed change pedal 24 after a fixed time from those detection results and calculation results. As the correlation data of the compensation means 31Q has a value (average value) Δi of the difference of the current value Ia supplied to a servo valve 27 at the time of accelerating actuation, and the current value Ib supplied to a servo valve 27 at the time of deceleration operation for a given actuation position of the pump swash plate 16A, which is required to compensate for the difference Δf between the servo pressure Fa at the time of the accelerating actuation and the servo pressure Fb at the time of deceleration operation for a given actuation position of the pump swash plate 16A.

The control program of the compensation means 31Q compares the predicted actuation position β, which is the calculation result of the operation program, with the current position θ, and controls actuation of the servo valve 27 so that the difference Δf of the servo pressure Fa at the time of the accelerating actuation and the servo pressure Fb at the time of deceleration operation for the current position of the pump swash plate 16A is compensated based on the correlation data, when the difference becomes beyond the predetermined setting α.

More specifically, when the switch to forward travel deceleration operation from forward travel accelerating actuation of the speed change pedal 24 is detected based on detected information from the pedal sensor 29, the current position θ of the obtained speed change pedal 24 is compared with the predicted actuation position β, which is a calculation result of the operation program. When the difference becomes greater than the predetermined value (β<θ−α), in order to decrease the servo pressure F corresponding to the current position of the pump swash plate 16A promptly from the servo pressure Fa at the time of accelerating actuation to the servo pressure Fb at the time of deceleration operation, the current is lowered at once to the current value Ib for obtaining the servo pressure Fb at the time of the deceleration operation corresponding to the current position of the pump swash plate 16A by subtracting the difference value Δi from the current value Ia for obtaining the servo pressure Fa at the time of the accelerating actuation corresponding to the current position of the pump swash plate 16A.

When the switch to the forward travel accelerating actuation from the forward travel deceleration operation of the speed change pedal 24 is detected based on detected information from the pedal sensor 29, the current position θ of the speed change pedal 24 obtained at that time is compared with the predicted actuation position β, which is the calculation result of an operation program. When the difference becomes greater than the predetermined value (β>θ−α) in order to increase the servo pressure F corresponding to the current position of the pump swash plate 16A promptly from the servo pressure Fb at the time of deceleration operation to the servo pressure Fa at the time of accelerating actuation, the current is raised at once to the current value Ia for obtaining the servo pressure Fa at the time of the accelerating actuation corresponding to the current position of the pump swash plate 16A by adding the difference value Δi to the current value Ib for obtaining the servo pressure Fb at the time of the deceleration operation corresponding to the current position of the pump swash plate 16A. When a switch to reverse travel deceleration operation from reverse travel accelerating actuation of the speed change pedal 24 is detected based on detected information from the pedal sensor 29, the current position θ of the speed change pedal 24 obtained at that time is compared with the predicted actuation position β, which is a calculation result of an operation program. When the difference becomes greater than the predetermined setting (β<θ−α), in order to lower the servo pressure F corresponding to the current position of the pump swash plate 16A promptly from the servo pressure Fa at the time of accelerating actuation to the servo pressure Fb at the time of deceleration operation, the current is lowered at once to the current value Ib for obtaining the servo pressure Fb at the time of the deceleration operation corresponding to the current position of the pump swash plate 16A by subtracting the difference value Δi from the current value Ia for obtaining the servo pressure Fa at the time of the accelerating actuation corresponding to the current position of the pump swash plate 16A.

When switch to the reverse travel accelerating actuation from the reverse travel deceleration operation of the speed change pedal 24 is detected based on detected information from the pedal sensor 29, the current position θ of the speed change pedal 24 then obtained is compared with the predicted actuation position β, which is the calculation result of the operation program. When the difference becomes greater than the predetermined setting (β>θ−α), in order to increase the servo pressure F corresponding to the current position of the pump swash plate 16A promptly from the servo pressure Fb at the time of deceleration operation to the servo pressure Fa at the time of accelerating actuation, the current is increased at once to the current value Ia for obtaining the servo pressure Fa at the time of the accelerating actuation corresponding to the current position of the pump swash plate 16A by adding the difference value Δi to the current value Ib for obtaining the servo pressure Fb at the time of the deceleration operation corresponding to the current position of the pump swash plate 16A.

Therefore, in the forward travel deceleration operation after switching to the forward travel slowdown from forward travel accelerating of the speed change pedal 24, the servo pressure Fa corresponding to the pump swash plate 16A falls to the servo pressure Fb at the time of the forward travel deceleration operation corresponding to the actuation position of the speed change pedal 24 promptly with actuation of the speed change pedal 24, which improves response of a deceleration operation of the pump swash plate 16A to the shift operation position for forward travel corresponding to the actuation position of the speed change pedal 24.

In the forward travel accelerating actuation after switching to forward travel accelerating from the forward travel slowdown of the speed change pedal 24, the servo pressure Fb for the pump swash plate 16A raises promptly with actuation of the speed change pedal 24 to the servo pressure Fa at the time of the forward travel accelerating actuation corresponding to the actuation position of the speed change pedal 24, which improves the response in accelerating actuation of the pump swash plate 16A to the shift operation position for forward travel corresponding to the actuation position of the speed change pedal 24.

In the reverse travel deceleration operation after switching to the reverse travel decelerating from reverse travel accelerating of the speed change pedal 24, the servo pressure Fa to the pump swash plate 16A falls promptly to the servo pressure Fb at the time of the reverse travel deceleration operation corresponding to the actuation position of the speed change pedal 24 with actuation of the speed change pedal 24, which improves response in a deceleration operation of the pump swash plate 16A to the shift operation position for reverse travel corresponding to the actuation position of the speed change pedal 24 by the response.

In the reverse travel accelerating actuation after switching to reverse travel acceleration from the reverse travel deceleration of the speed change pedal 24, the servo pressure Fb for the pump swash plate 16A rises promptly with actuation of the speed change pedal 24 to the servo pressure Fa at the time of the reverse travel accelerating actuation corresponding to the actuation position of the speed change pedal 24, which improves response in accelerating actuation of the pump swash plate 16A to the shift operation position for reverse travel corresponding to the actuation position of the speed change pedal 24.

That is, because of the ability to perform shift operation of the pump swash plate 16A in consideration of the hysteresis which exists between the actuation position of the pump swash plate 16A, and a servo pressure, by the electronic type servo control mechanism 25, the response delay of the pump swash plate 16A resulting from the hysteresis can be controlled effectively, improving response quality to operator actuation. The hysteresis which exists between the actuation position of the pump swash plate 16A and a servo pressure is influenced by the temperature of the hydraulic fluid supplied to the cylinder 26 for pumps.

The lower the temperature of the hydraulic fluid is, the greater the difference $\Delta f$ of the servo pressure Fa at the time of the accelerating actuation to the actuation position of the pump swash plate 16A and the servo pressure Fb at the time of deceleration operation becomes. Accordingly, the hydraulic circuit to the cylinder 26 for pumps has the oil temperature sensor 43 which detects the temperature of the hydraulic fluid supplied to a regulator valve 28. And the compensation means 31Q takes into consideration of the fact that the lower the temperature of the hydraulic fluid supplied to a regulator valve 28 is, the greater the difference $\Delta f$ of the servo pressure Fa at the time of the accelerating actuation to the actuation position of the pump swash plate 16A and the servo pressure Fb at the time of deceleration operation becomes. And the means 31Q is configured to change the difference value $\Delta i$ between the current value Ia supplied to a servo valve 27 at the time of accelerating actuation and the current value Ib supplied to a servo valve 27 at the time of deceleration operation based on detected information from the oil temperature sensor 43.

To describe in more detail, the compensation means 31Q has the map data which correlates the temperature of the hydraulic fluid supplied to a regulator valve 28 with the correction coefficient which compensates the current difference value $\Delta i$. Map data correlates the temperature with the correction coefficient of hydraulic fluid such that the lower the temperature of hydraulic fluid is, the greater the value $\Delta i$ of the difference of a current value becomes. And the control program of the compensation means 31Q selects the correction coefficient according to the temperature of the hydraulic fluid based on detected information from the map data and oil temperature sensor 43, and multiply the value $\Delta i$ of the difference of a current value by the correction coefficient, so that the value $\Delta i$ of the difference of a current value is amended to the proper value according to the temperature of the hydraulic fluid at that time.

That is, in response to the fact that, the lower the temperature of the hydraulic fluid supplied to the regulator valve 28 is, the greater the difference $\Delta f$ of the servo pressure Fa at the time of the accelerating actuation to the actuation position of the pump swash plate 16A and the servo pressure Fb at the time of deceleration operation becomes. And the current difference value $\Delta i$ is changed correspondingly to a larger value.

Thus, when acceleration or deceleration operation by the speed change pedal 24 is detected, the servo pressure F corresponding to the current position of the pump swash plate 16A can be promptly changed into the servo pressure corresponding to the shift operation after switch actuation regardless of the temperature of the hydraulic fluid supplied to the cylinder 26 for pumps. As a result, this allows shift operation which can control the response delay in consideration of change of the hysteresis by the temperature of the hydraulic fluid supplied to the cylinder 26 for pumps of the pump swash plate 16A.

The control device 31 has, as a control program, the commanding means which orders a start and a stop of control actuation to the speed change control means 31A.

The commanding means issues a command to stop the control to the speed change control means 31A when the speed change pedal 24 is detected to be operated in the neutral position based on detected information from the pedal sensor 29, if the pump swash plate 16A is detected to have arrived at the setting position near the predetermined neutral position based on detected information from the swash-plate sensor 30, and if the vehicle speed is detected to have fallen to the low set speed set in advance, based on the output of the vehicle speed sensor (speed detecting means) 50 which detects the vehicle speed from the output rotation rate of the gear type speed change device 11.

Also, the speed change control means 31A is ordered to stop the control when the speed change pedal 24 is not detected to have been operated to the neutral position based on detected information from the pedal sensor 29, and if the pump swash plate 16A is detected to have been operated to the shift operation region opposite beyond the neutral position, based on detected information from the swash-plate sensor 30.

That is, when the speed change pedal 24 arrives at the neutral position by the deceleration operation of the speed change pedal 24, the pump swash plate 16A is operated toward the shift operation position (neutral position) corresponding to the neutral position of the speed change pedal 24 by control actuation of the speed change control means 31A based on the actuation, and by urging force of the forward travel decelerating spring 32 or the reverse travel decelerating spring 33.

When the pump swash plate 16A arrives at the setting position near the predetermined neutral position by this decelerating operation, it is determined whether the vehicle speed fell to the predetermined set speed. When it has not fell to a set speed, control actuation of the speed change control means 31A is continued.

On the other hand, if the vehicle speed falls to predetermined set speed, the speed change control means 31A will discontinue control actuation, and the pump swash plate 16A moves to the neutral position by the urging force of the forward travel decelerating spring 32 or the reverse travel decelerating spring 33.

Moreover, up to the time the speed change pedal 24 arrives at the neutral position by the deceleration operation of the speed change pedal 24 or when it reaches the neutral position, if the pump swash plate 16A is operated to the shift operation region to the opposite side beyond the neutral position, the speed change control means 31A suspends the control operation, so that the pump swash plate 16A moves to the neutral position by the urging force of the forward travel decelerating spring 32 or the reverse travel decelerating spring 33.

Various setting is possible for the set speed. Here, it is set to a low enough speed so that the pump swash plate 16A would not be operated in the accelerating direction by the running inertia against the urging of the forward travel decelerating spring 32 or the reverse travel decelerating spring 33. As a result, despite the difference between the pump swash plate 16A and the swash-plate sensor 30 caused by the passage of time, when the speed change pedal 24 is located in the neutral position, the pump swash plate 16A would reliably be located in the neutral position.

This prevents a problem of the vehicle running despite the speed change pedal 24 being in the neutral position because of the discrepancy between the pump swash plate 16A and the swash-plate sensor 30. And in this condition, since the vehicle speed is sufficiently low, accelerating actuation of the pump swash plate 16A caused by the inertia during travel is avoided.

When the pump swash plate 16A is located in the neutral position by the urging force of the forward travel decelerating spring 32 or the reverse travel decelerating spring 33, the commanding means compares the real neutral position (real zero speed position) of the pump swash plate 16A detected by the swash-plate sensor 30 with the set neutral position (set zero speed position) of the pump swash plate 16A which was set to correspond to the neutral position of the speed change pedal. When it is detected that the speed change pedal 24 is operated in the direction corresponding to the direction in which the real neutral position of the pump swash plate 16A is displaced with respect to the set neutral position of the pump swash plate 16A, based on detected information from the comparison result and pedal sensor 29, the command means orders suspension of control by the speed change control means 31A until the speed change pedal 24 arrives at the actuation position corresponding to the real neutral position of the pump swash plate 16A.

And when the speed change pedal 24 arrives at a corresponding actuation position to the real neutral position of the pump swash plate 16A, the speed change control means 31A is ordered to start control. On the other hand, if it is detected that the speed change pedal 24 is operated in the direction opposite to the direction corresponding to the direction in which the real neutral position of the pump swash plate 16A is displaced with respect to the set neutral position of the pump swash plate 16A, the speed change control means 31A is ordered to initiate control. Thus, when accelerating actuation of the speed change pedal 24 is carried out in the direction corresponding to the direction in which the real zero speed position of the pump swash plate 16A is displaced with respect to the set zero speed position of the pump swash plate 16A, the pump swash plate 16A moves to the neutral position by the urging force of the forward travel decelerating spring 32 and the reverse travel decelerating spring 33 until the speed change pedal 24 arrives at the actuation position corresponding to the real zero speed position of the pump swash plate 16A.

And as the speed change pedal 24 arrives at the actuation position corresponding to the real zero speed position of the pump swash plate 16A, the speed change control means 31A starts control.

Accelerating actuation of the pump swash plate 16A according to actuation of the speed change pedal 24 is carried out by the control against the urging force of the forward travel decelerating spring 32 or the reverse travel decelerating spring 33. On the other hand, when accelerating actuation of the speed change pedal 24 is carried out in the direction opposite to the direction corresponding to the direction in which the real zero speed position of the pump swash plate 16A is displaced with respect to the setting zero speed position of the pump swash plate 16A, the speed change control means 31A starts control, and an accelerating actuation of the pump swash plate 16A according to the actuation of the speed change pedal 24 is carried out against the urging force of the forward travel decelerating spring 32 or the reverse travel decelerating spring 33.

As a result, this solves the problem that, during accelerating actuation from the zero speed position of the speed change pedal 24, the pump swash plate 16A is operated in the direction opposite to the direction corresponding to the manipulating direction of the speed change pedal 24 due to discrepancies between the pump swash plate 16A and the swash-plate sensor 30 caused by passage of time, resulting in the vehicle running in the direction opposite to the manipulating direction of the speed change pedal 24.

Other Embodiments

[1] The work vehicle may be a riding type rice planting machine, a riding type mowing machine, or a wheel loader.

[2] The continuously variable speed change device 10 may be a belt type etc.

[3] Correlation data may make have a plurality of correlating equations which corresponded to various conditions and/or may have multipliers corresponding to various conditions.

[4] Planetary gear transmission may be used instead of the stepwise change speed device 11.

[5] An electric cylinder, an electric motor or a hydraulic motor, etc. may be used as a control means 55.

[6] The speed change control 24 may be a speed change lever etc.

What is claimed is:

1. A load control structure for a work vehicle comprising:
   set rotation speed detection means for detecting a set rotation of an engine of the work vehicle;
   actual rotation speed detection means that senses an actual rotational speed of the engine;
   continuously variable speed change device that receives power from the engine of the work vehicle;
   speed change position detecting means for detecting a speed change operation position of the continuously variable speed change device;
   operating means for speed-shifting the continuously variable speed change device;
   control means for controlling the operation of the operating means;
   operation speed setting means for setting an operation speed at which the continuously variable speed change device is operated;
   wherein the control means calculates a drop amount of the actual engine rotation speed from the set rotation speed based on the detected information from the set rotation speed detection means and the actual rotation speed detection means, and
   sets a limit operation position for the continuously variable speed change device based on the calculated drop amount and a correlation data that correlates the actual engine rotation speeds with operating positions of the continuously variable speed change device, and controls the operating means such that the operating position of the continuously variable speed change device moves to the limit operating position based on the set limit operating position and detected information from the speed change position detecting means, and wherein the control means controls the operation of the operating means such that the continuously variable speed change device is operated by the operating means at the operation speed set by the operation speed setting means.

2. A load control structure for work vehicle according to claim 1, wherein the operation speed setting means calculates a rate of change in the actual engine rotation speed based on the detected information from the rotation speed detection means, and sets the operation speed such that the greater the calculated rate of change is, the greater the operation speed is.

3. A load control structure for work vehicle according to claim 1, wherein the structure further has a stepwise speed change device and the stepwise speed change position detection means for detecting the speed position of the stepwise speed change device, and wherein the operation speed setting means controls the operation means, based on the detected information from the stepwise speed change position detection means, such that the lower the speed position of the stepwise speed change device is, the greater the speed at which the continuously variable speed change device is operated toward the limit operation position is.

4. A load control structure for work vehicle according to claim 1, wherein the control means never sets the limit operation position for the continuously variable speed change position to the neutral position.

5. A method for controlling a speed of a work vehicle, the work vehicle having set rotation speed detection means for detecting a set rotation of an engine of the work vehicle; actual rotation speed detection means that senses an actual rotational speed of the engine; continuously variable speed change device that receives power from the engine of the work vehicle; speed change position detecting means for detecting a speed change operation position of the continuously variable speed change device; operating means for speed-shifting the continuously variable speed change device; control means for controlling the operation of the operating means; and operation speed setting means for setting an operation speed at which the continuously variable speed change device is operated the method comprises the steps of:

calculating a drop amount of the actual engine rotation speed from the set rotation speed based on the detected information from the set rotation speed detection means and the actual rotation speed detection means;

setting a limit operation position for the continuously variable speed change device based on the calculated drop amount and a correlation data that correlates the actual engine rotation speeds with operating positions of the continuously variable speed change device;

controlling the operating means such that the operating position of the continuously variable speed change device moves to the limit operating position based on the set limit operating position and detected information from the speed change position detecting means; and controlling the operation of the operating means such that the continuously variable speed change device is operated by the operating means at the operation speed set by the operation speed setting means.

6. A method according to claim 5, further comprising:

calculating a rate of change in a drop amount of the actual engine rotation speed based on the detected information from the set rotation speed detection means;

setting a operation speed at which the continuously variable change speed device is operated such that the greater the rate of change is, the greater the operation speed of the continuously variable speed change device is.

7. A method according to claim 5, wherein the structure further has a stepwise speed change device and the stepwise speed change position detection means for detecting the speed position of the stepwise speed change device, and wherein the method includes controlling the operation means, based on the detected information from the stepwise speed change position detection means, such that the lower the speed position of the stepwise speed change device is, the greater the speed at which the continuously variable speed change device is operated toward the limit operation position is.

8. A method according to claim 5, wherein the control means never sets the limit operation position for the continuously variable speed change position to the neutral position.

* * * * *